(12) United States Patent
Tiwari et al.

(10) Patent No.: US 9,292,749 B2
(45) Date of Patent: *Mar. 22, 2016

(54) BIOMETRIC MATCHING TECHNOLOGY

(71) Applicant: Accenture Global Services Limited, Dublin (IE)

(72) Inventors: Abhinav Tiwari, Uttar Pradesh (IN); Sanjoy Paul, Karnataka (IN)

(73) Assignee: Accenture Global Services Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 14/882,552

(22) Filed: Oct. 14, 2015

(65) Prior Publication Data

US 2016/0034765 A1 Feb. 4, 2016

Related U.S. Application Data

(63) Continuation of application No. 14/585,480, filed on Dec. 30, 2014, now Pat. No. 9,195,893, which is a continuation of application No. 13/598,819, filed on Aug. 30, 2012, now Pat. No. 8,948,465.

(30) Foreign Application Priority Data

Apr. 9, 2012 (IN) .......................... 1400/CHE/2012

(51) Int. Cl.
*G06K 9/00* (2006.01)
*G06K 9/38* (2006.01)
(Continued)

(52) U.S. Cl.
CPC ...... *G06K 9/00771* (2013.01); *G06F 17/30256* (2013.01); *G06K 9/00885* (2013.01); *G06K 9/38* (2013.01); *G06K 9/6814* (2013.01)

(58) Field of Classification Search
CPC ................... G06F 17/30256; G06K 9/00885; G06K 9/6807
USPC ......................................................... 382/115
See application file for complete search history.

(56) References Cited

U.S. PATENT DOCUMENTS 6,111,517 A 8/2000 Atick et al.
8,948,465 B2 2/2015 Tiwari et al.
(Continued)

FOREIGN PATENT DOCUMENTS

EP 0786735 7/1997
EP 1600882 11/2005

OTHER PUBLICATIONS

EP Search Report in Application No. 13000443.5 dated Jul. 31, 2014, 6 pages.
(Continued)

*Primary Examiner* — Manuchehr Rahmjoo
(74) *Attorney, Agent, or Firm* — Fish & Richardson P.C.

(57) ABSTRACT

Biometric matching technology, in which a watch list is managed, multiple images of a potential suspect are accessed, and parallel pre-processing of the multiple images is controlled. Based on the pre-processing, an image of the potential suspect to use in matching against the watch list is determined and the determined image is used to search sorted biometric data included in the watch list. A subset of persons from the watch list is identified based on the search and parallel analysis of the determined image of the potential suspect against detailed biometric data associated with the subset of persons in the watch list is controlled. Based on the parallel analysis, it is determined whether the potential suspect matches a person in the watch list and a result is outputted based on the determination.

21 Claims, 22 Drawing Sheets

(51) Int. Cl.
*G06K 9/68* (2006.01)
*G06F 17/30* (2006.01)

(56) References Cited

U.S. PATENT DOCUMENTS

| | | | |
|---|---|---|---|
| 9,020,207 | B2 | 4/2015 | Paul et al. |
| 2003/0184468 | A1 | 10/2003 | Chen et al. |
| 2004/0240711 | A1 | 12/2004 | Hamza et al. |
| 2005/0063566 | A1 | 3/2005 | Beek et al. |
| 2005/0265603 | A1 | 12/2005 | Porter et al. |
| 2006/0104484 | A1 | 5/2006 | Bolle et al. |
| 2006/0104487 | A1 | 5/2006 | Porter et al. |
| 2007/0047775 | A1 | 3/2007 | Okubo |
| 2007/0269082 | A1 | 11/2007 | Matsuyama |
| 2010/0157040 | A1* | 6/2010 | Ofir ............ G06K 9/00275 348/77 |
| 2010/0157128 | A1 | 6/2010 | Choi et al. |
| 2010/0329568 | A1 | 12/2010 | Gamliel et al. |
| 2011/0074950 | A1 | 3/2011 | Oka et al. |
| 2011/0106734 | A1 | 5/2011 | Boult et al. |
| 2011/0228094 | A1 | 9/2011 | Cheng et al. |
| 2012/0314911 | A1 | 12/2012 | Paul et al. |
| 2013/0195316 | A1 | 8/2013 | Bataller et al. |
| 2013/0266193 | A1 | 10/2013 | Tiwari et al. |
| 2015/0161460 | A1 | 6/2015 | Tiwari et al. |
| 2015/0178569 | A1 | 6/2015 | Tiwari et al. |

OTHER PUBLICATIONS

European Office Action in Application No. 13162720.2-1901 dated Apr. 23, 2014, 9 pages.
European Search Report for Application No. 13162720.0-1901 dated Aug. 13, 2013, 3 pages.
Corresponding European Application No. EP12004276.7, "European Search Report", Dec. 4, 2012, 5 pages.
U.S. Non-Final Office Action for U.S. Appl. No. 13/409,584 dated Aug. 29, 2014, 21 pages.
U.S. Non-Final Office Action for U.S. Appl. No. 14/585,480 dated Jun. 5, 2015, 21 pages.
U.S. Notice of Allowance for U.S. Appl. No. 13/409,584 dated Nov. 12, 2014, 12 pages.
U.S. Notice of Allowance for U.S. Appl. No. 13/598,819 dated Sep. 26, 2014, 24 pages.
U.S. Notice of Allowance for U.S. Appl. No. 14/585,480 dated Jul. 31, 2015, 8 pages.
Han et al: "A Non-uniform Quantizing Approach to Protect Biometric Templates", Intelligent Information Hiding and Multimedia Signal Processing, 2006. IIH-MSP '06. International Conference on, IEEE, PI, Dec. 1, 2006, pp. 693-698, XP031034150.
Hsieh et al., "Image Enhancement and Image Hiding Based on Linear Image Fusion—Image Fusion," Osamu Ukimura (Ed.), ISBN: 978-953-307-679-9, InTech, Available from: http://www.intechopen.com/books/image-fusion/image-enhancement-and-image-hiding-based-on-linearimage-fusion, Jan. 12, 2011, pp. 23-42.
Knuth, "The Art of Computer Programming", vol. 3, Section 6.2.1 :Searching an Ordered Table, Second Edition, Third Printing. Addison-Wesley, Aug. 1998 ISBN 0-201-89685-0, 20 pages.
Li et al: "Biometrics at a Distance: Issues, Challenges, and Prospects", Jan. 1, 2009, Handbook of Remote Biometrics : Advances in Pattern Recognition; [Advances in Pattern Recognition], Springer, UK, pp. 3-21, XP008163781.
Lovell et al.: "Invited Paper: Embedded Face and Biometric Technologies for National and Border Security", Computer Vision and Pattern Recognition Workshops (CVPRW), 2011 IEEE Computer Society Conference on, IEEE, Jun. 20, 2011, pp. 117-122, XP031926583.
Lovell et al.: "Parallel Distributed Face Search System for National and Border Security", The 7th U.S./Australia Joint Workshop on Defense Applications of Signal Processing (DASP), Jul. 10, 2011, pp. 117-123, XP055074042.
Monro, et al., "DCT-based Iris Recognition" published in IEEE Transactions on Pattern Analysis and Machine Intelligence, vol. 29, No. 4, Apr. 2007, 10 pages.
Tsalakanidou et al: "A 3D face and hand biometric system for robust user-friendly authentication", Pattern Recognition Letters, Elsevier, Amsterdam, NL, vol. 28, No. 16, Oct. 11, 2007, pp. 2238-2249, XP022293676.
Turk, et al. "Eigenfaces for Recognition", Journal of Cognitive Neuroscience, vol. 3, No. 1, Jan. 1, 1991, pp. 71-86.

* cited by examiner

| 910 | Number of captured images for pre-processing |
|---|---|
| Lighting | |
| No noticeable light | 50 |
| Night with dim light | 20 |
| Indoor | 10 |
| Daylight | 5 |

| 920 | Number of captured images for pre-processing |
|---|---|
| Distance | |
| More than 200 yards | 50 |
| 100-200 yards | 20 |
| 50-100 yards | 10 |
| Less than 50 yards | 5 |

FIG. 9

| Criticality | Context / Application area | Number of images in a batch / number of different persons |
|---|---|---|
| Very High | Crime-Sensitive Areas, Diamond Jewelry Stores, etc. | 50 |
| High | Airports, Railway Stations, etc. | 20 |
| Medium | Public transport, Public parks, Vehicular Surveillance | 10 |
| Low | Home security, School campus security | 5 |

BIOMETRIC MATCHING TECHNOLOGY

CROSS-REFERENCE TO RELATED APPLICATION(S)

The present application is a continuation of U.S. application Ser. No. 14/585,480, filed Dec. 30, 2014, which is a continuation of U.S. application Ser. No. 13/598,819, filed Aug. 30, 2012, now U.S. Pat. No. 8,948,465, issued Feb. 3, 2015, which claims the benefit of Indian Patent Application No. 1400/CHE/2012, filed on Apr. 9, 2012, which are incorporated herein by reference in their entirety for all purposes.

FIELD

This disclosure relates to biometric matching technology.

BACKGROUND

A typical biometric matching system includes a database of biometric information (e.g., fingerprints, retina scans, facial images, etc.) about individuals. To identify or authenticate a sample of biometric information, the typical biometric matching system compares the sample with entries in the database one by one until a match is found. As a result, the time to find a matching entry grows linearly and may be time consuming when the database includes many entries.

SUMMARY

In one aspect, a system includes at least one processor and at least one memory coupled to the at least one processor having stored thereon instructions which, when executed by the at least one processor, causes the at least one processor to perform operations. The operations include managing a watch list that includes sorted biometric data for persons in the watch list and associations to additional biometric data for persons in the watch list and accessing multiple images of a potential suspect. The operations also include controlling parallel pre-processing of the multiple images of the potential suspect, determining an image of the potential suspect to use in matching against the watch list based on the pre-processing, and using the determined image of the potential suspect to search the sorted biometric data included in the watch list. The operations further include identifying a subset of persons from the watch list based on the search of the sorted biometric data included in the watch list and controlling parallel analysis of the determined image of the potential suspect against biometric data associated with the subset of persons in the watch list. In addition, the operations include determining whether the potential suspect matches a person in the watch list based on the parallel analysis of the determined image of the potential suspect against biometric data associated with the subset of persons in the watch list and outputting a result based on the determination of whether the potential suspect matches a person in the watch list. In another aspect, a method may include one or more of the operations described above. In yet another aspect, a computer-readable storage medium may be operable to cause a processor to perform one or more of the operations described above.

Implementations may include one or more of the following features. For example, the operations may include maintaining numeric index values for persons in the watch list sorted in the watch list and maintaining blobs of images of the persons in the watch list stored on different partition servers.

In some implementations, the operations may include creating, in relational database storage, a table for the watch list, accessing biometric data for a person to include on the watch list, and determining an index value from the accessed biometric data. In these implementations, the operations may include storing the index value with an identifier for the person at an appropriate location in the table and determining whether blob data for the accessed biometric data of the person meets a threshold storage size. Based on a determination that the blob data for the accessed biometric data of the person does not meet the threshold storage size, the blob data may be stored in the table with the identifier. Based on a determination that the blob data for the accessed biometric data of the person meets the threshold storage size, the blob data may be stored in non-relational storage and a link to the blob data may be stored in the table with the identifier.

In addition, the operations may include creating the table for the watch list in a relational database included in a storage account provided by a cloud service provider, storing the blob data in a non-relational storage included in the storage account provided by the cloud service provider, and controlling the blob data to be stored on a different partition server than all other blob data stored for persons on the watch list. The operations also may include determining at least one criterion relevant to the multiple images of the potential suspect based on at least one of sensor and camera data, selecting a number of images to use in pre-processing based on the at least one criterion, and controlling parallel pre-processing of the selected number of images of the potential suspect. The operations further may include determining at least one criterion relevant to the multiple images of the potential suspect based on at least one of sensor and camera data, selecting types of operations to perform in pre-processing based on the at least one criterion, and controlling parallel pre-processing of the multiple images of the potential suspect using the selected types of operations to perform in pre-processing.

In some examples, the operations may include determining at least one criterion relevant to the multiple images of the potential suspect based on at least one of sensor and camera data and selecting a number of images to use in pre-processing based on the at least one criterion. In these examples, the operations may include selecting types of operations to perform in pre-processing based on the at least one criterion and controlling parallel pre-processing of the selected number of images of the potential suspect using the selected types of operations to perform in pre-processing.

In some implementations, the operations may include accessing a reference image, computing a similarity score that represents similarity between the determined image of the potential suspect and the reference image based on the accessed reference image, and searching the watch list using the computed similarity score. In these implementations, the operations may include identifying a subset of persons in the watch list having a similarity score within a threshold of the computed similarity score for the potential suspect.

Further, the operations may include determining at least one criterion relevant to the multiple images of the potential suspect based on at least one of sensor and camera data, selecting, from among multiple reference images, a reference image based on the at least one criterion, and accessing the selected reference image. The operations may include evaluating distribution of similarity scores in the watch list, selecting, from among multiple reference images, a reference image based on the evaluation of the distribution of similarity scores in the watch list, and accessing the selected reference image. The operations also may include determining at least one criterion relevant to the multiple images of the potential suspect based on at least one of sensor and camera data, evaluating distribution of similarity scores in the watch list, selecting, from among multiple reference images, a reference image based on the at least one criterion and the evaluation of the distribution of similarity scores in the watch list, and accessing the selected reference image.

In some implementations, the operations may include determining a quality measure for the determined image of the potential suspect and images of persons in the watch list and setting a score threshold based on the determined quality measure for the determined image of the potential suspect and images of persons in the watch list. In these implementations, the operations may include identifying a subset of persons in the watch list having a similarity score within the set score threshold of the computed similarity score for the potential suspect.

In some examples, the operations may include determining a number of matches within a set of matches representative of the subset of persons in the watch list and determining whether the number of matches within the set of matches is within a match threshold. In these examples, the operations may include using the set of matches as the subset of persons in the watch list for which to perform additional processing based on a determination that the number of matches within the set of matches is within the match threshold.

Based on a determination that the number of matches within the set of matches is not within the match threshold, the operations may include selecting a new reference image that is different than the accessed reference image, identifying a new set of matches within the score threshold for the new reference image, determining the number of matches within each of the set of matches and the new set of matches, and determining whether the number of matches within each of the set of matches and the new set of matches is within the match threshold. Based on a determination that the number of matches within each of the set of matches and the new set of matches is within the match threshold, the matches in each of the set of matches and the new set of matches may be used as the subset of persons in the watch list for which to perform additional processing. Based on a determination that the number of matches within each of the set of matches and the new set of matches is not within the match threshold, an additional reference image may be used in continuing to narrow potential matches.

In some implementations, the operations may include determining a context of a situation associated with the determined image of the potential suspect, setting a batch size based on the determined context of the situation, and selecting a batch of images from the subset of persons in the watch list based on the batch size. In these implementations, the operations may include controlling parallel analysis of the determined image of the potential suspect against the batch of images and controlling parallel analysis of the determined image of the potential suspect against additional batches of images until images of all of the subset of persons in the watch list have been analyzed.

In some examples, the operations may include determining a criticality of the situation associated with the determined image of the potential suspect, setting a batch size based on the determined criticality of the situation, and selecting a batch of images from the subset of persons in the watch list based on the batch size. In these examples, the operations may include controlling parallel analysis of the determined image of the potential suspect against the batch of images and controlling parallel analysis of the determined image of the potential suspect against additional batches of images until images of all of the subset of persons in the watch list have been analyzed.

In some implementations, the operations may include determining a context of a situation associated with the determined image of the potential suspect, determining a criticality of a situation associated with the determined image of the potential suspect, setting a batch size based on the determined context of the situation and the determined criticality of the situation, and selecting a batch of images from the subset of persons in the watch list based on the batch size. In these implementations, the operations may include controlling parallel analysis of the determined image of the potential suspect against the batch of images and controlling parallel analysis of the determined image of the potential suspect against additional batches of images until images of all of the subset of persons in the watch list have been analyzed.

In addition, the operations may include determining whether the number of unprocessed persons in the subset of persons in the watch list is greater than a batch size and, based on a determination that the number of unprocessed persons in the subset is less than or equal to the batch size, performing a comparison of the determined image of the potential suspect against all remaining unprocessed persons in the subset of persons in the watch list. The operations also may include selecting a batch of persons from the subset of persons in the watch list based on a determination that the number of unprocessed persons in the subset is greater than the batch size and performing a comparison of the determined image of the potential suspect against all persons in the selected batch of persons. The operations further may include determining whether a match is found within the selected batch based on the comparison of the determined image of the potential suspect against all persons in the selected batch. Based on a determination that a match is found within the selected batch, processing may end and the match may be output. Based on a determination that a match is not found within the selected batch, one or more additional batches of images may be processed in parallel until all of the subset of persons in the watch list have been processed or a match is found.

In some examples, the operations may include identifying a person of interest from the watch list, determining a profile for the identified person of interest from the watch list, accessing one or more images of a crowd that includes multiple potential suspects, and comparing the profile for the identified person of interest from the watch list to profiles of the multiple potential suspects included in the one or more images of the crowd. In these examples, the operations may include selecting, from among the multiple potential suspects included in the one or more images of the crowd, the potential suspect for further processing based on the comparison revealing that the profile for the identified person of interest from the watch list matches a profile of the potential suspect. In these examples, the operations of accessing multiple images of the potential suspect, controlling parallel pre-processing of the multiple images of the potential suspect, determining the image of the potential suspect to use in matching against the watch list, using the determined image of the potential suspect to search the sorted biometric data included in the watch list, identifying the subset of persons from the watch list, controlling parallel analysis of the determined image of the potential suspect against biometric data associated with the subset of persons in the watch list, determining whether the potential suspect matches a person in the watch list, and outputting the result based on the determination of whether the potential suspect matches a person in the watch list may be conditioned on the selection of the potential suspect for further processing.

The details of one or more implementations are set forth in the accompanying drawings and the description, below. Other potential features of the disclosure will be apparent from the description and drawings, and from the claims.

BRIEF DESCRIPTION OF THE DRAWINGS

FIGS. 9 and 15 illustrate exemplary data structures used in performing biometric matching.

DETAILED DESCRIPTION

In some implementations, a multi-dimensional approach that leverages facial recognition technology is used to identify a suspect in a crowd in real time. The approach converts a sequential face matching process to a parallel process, leveraging flexible computing and storage resources in the cloud for parallel processing while constraining the number of resources to be used in the cloud to optimize expenses without sacrificing performance.

Figure 1:
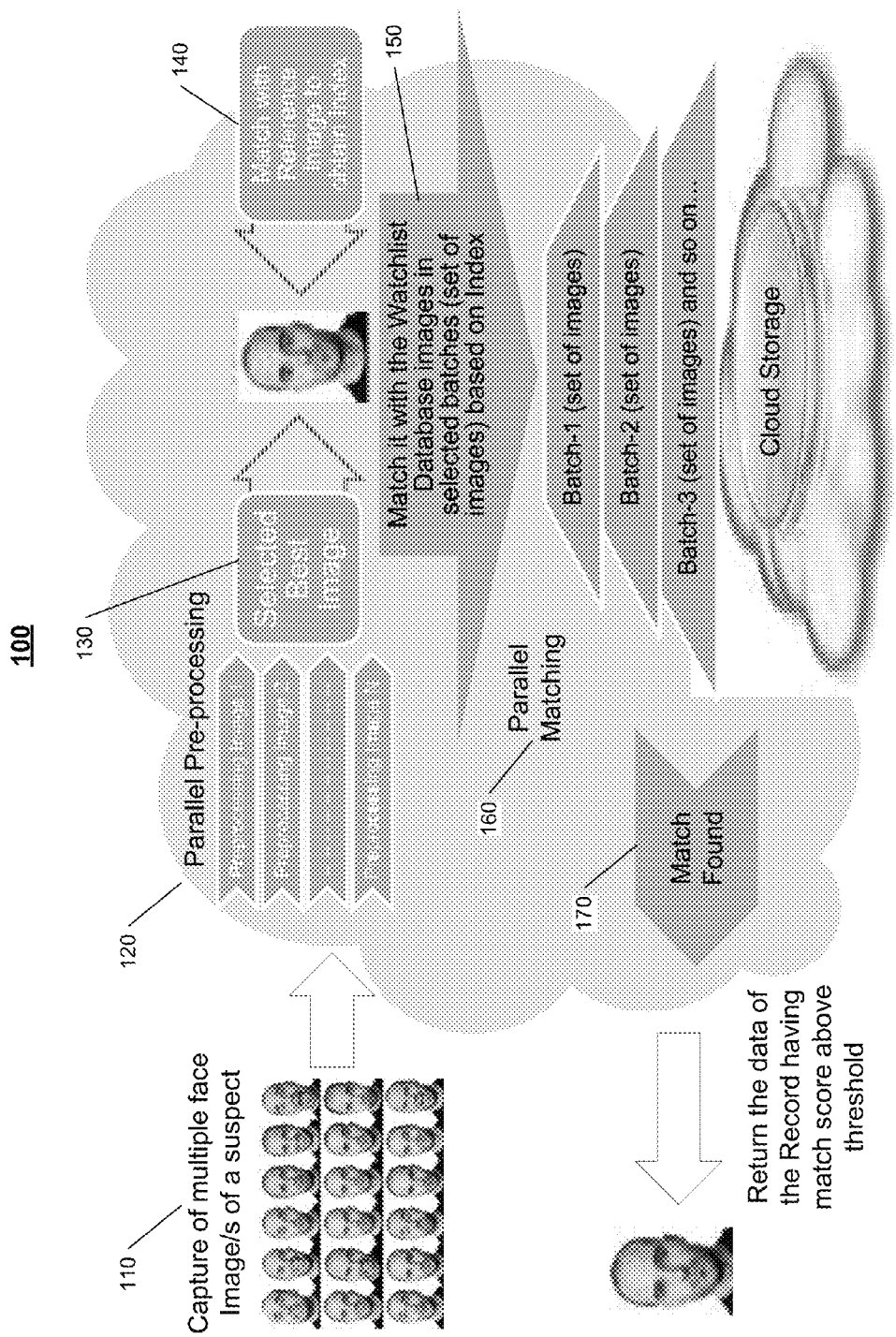
FIG. 1 is a diagram of an exemplary process.

FIG. 1 illustrates an example process 100 for performing biometric matching. As shown, multiple face images of a potential suspect are captured 110. For instance, multiple images of a crowd of people are captured over a relatively short period of time and a potential suspect within the crowd is identified in each of the multiple images of the crowd.

After the multiple images of the potential suspect are captured, pre-processing is performed on each of the captured images in parallel 120. The pre-processing includes any types of operations that enhance the quality of each of the captured images, such as blur removal, contrast enhancement, brightness adjustment, and skin tone enhancement. The pre-processing is performed in parallel using flexible computing resources provided by a cloud service provider. For instance, an amount of computing resources needed to pre-process all of the captured images in parallel are requisitioned from the cloud service provider and used to pre-process all of the captured images in parallel.

After the captured images have been pre-processed and enhanced, the enhanced versions of the captured images are analyzed and the best image of the potential suspect is selected 130 for use in matching. The selected image is compared against a reference image to obtain an index value 140 that reflects how similar the selected image is to the reference image. The index value of the selected image is then used to search a watch list of persons of interest 150. The watch list includes index values for all of the persons of interest in the watch list. The index values in the watch list were computed using the same reference image and the same process used to compute the index value for the selected image. The index values in the watch list also are sorted in ascending or descending order. When the watch list is searched using the index value of the selected image, the index values in the watch list are compared to the index value of the selected image and a subset of the index values within the watch list that are within a threshold value of the index value of the selected image are identified based on the comparison.

Because the index values in the watch list are sorted in ascending or descending order, all index values in the watch list do not need to be compared to the index value of the selected image. Rather, knowledge of how the index values are sorted in the watch list is leveraged to search in the watch list in a more efficient manner. For example, a binary search process may be used in which half the list of index values in the watch list may be discarded with each comparison performed. In this example, the index value of the selected image is compared to a central index value in the list of index values. If the index values are sorted in ascending order and the index value of the selected image is less than the central index value, the bottom half of the list is discarded because all the index values within the bottom half of the list are now known to be greater than the index value of the selected image. The binary search continues to compare the index value of the selected image to the central index value of the remaining index values in the watch list and discard half of the remaining index values with each comparison until the subset of index values within the threshold of the index value of the selected image is identified. By using a binary search process that leverages knowledge of how the index values are sorted in the watch list, the subset of index values within the threshold may be identified relatively quickly.

After identifying the subset of index values in the watch list that are within the threshold of the index value of the selected image, detailed face images (e.g., blobs storing face images) for the persons in the subset is accessed, a detailed face image (e.g., a blob storing a face image) for the potential suspect is accessed, and a parallel matching process is performed using the detailed face images for the persons in the subset and the detailed face image for the potential suspect 160. The detailed matching process is performed in parallel using flexible computing resources provided by a cloud service provider. For instance, an amount of computing resources needed to perform matching of all of the detailed face images for the persons in the subset against the detailed face image for the potential suspect in parallel are requisitioned from the cloud service provider and used to matching in parallel. The parallel matching is possible because each of the detailed face images for the persons in the subset are stored on a separate partition server within non-relational storage provided by the cloud service provider. Because the detailed face images for the persons in the subset are stored on different partition servers, the detailed face images for the persons in the subset may all be accessed in parallel and then compared against the detailed face image for the potential suspect in parallel.

In addition, as shown in FIG. 1, the detailed face images for the persons in the subset may be divided into batches and processed in batches, rather than processing all of the detailed face images for the persons in the subset in a single parallel process. Because requisitioning computing resources from a cloud service provider may be expensive, a decision may be made to sacrifice some performance benefits and divide the detailed face images into batches instead of processing all of the detailed face images at the same time. After the images have been divided into batches, all of the images in the first batch are matched against the detailed face image for the potential suspect in parallel. If a match is found in the first batch 170, the match is returned and processing of subsequent batches of images is omitted. However, if a match is not found in the first batch, all of the images in a second batch are matched against the detailed face image for the potential suspect in parallel. The batches of images are continued to be processed until a match is found 170 or all of the batches of images have been processed without finding a match.

Using the techniques described in FIG. 1, a potential suspect may be matched against a watch list relatively quickly and a crowd of people may be scanned for persons of interest in the watch list in a relatively short period of time (e.g., real time). In addition, because resources in the cloud are leveraged in scanning the crowd of people for persons of interest in the watch list, the processing is flexible and the cost of scanning the crowd quickly may be balanced against the desire to locate a person of interest in the crowd quickly.

Figure 2:
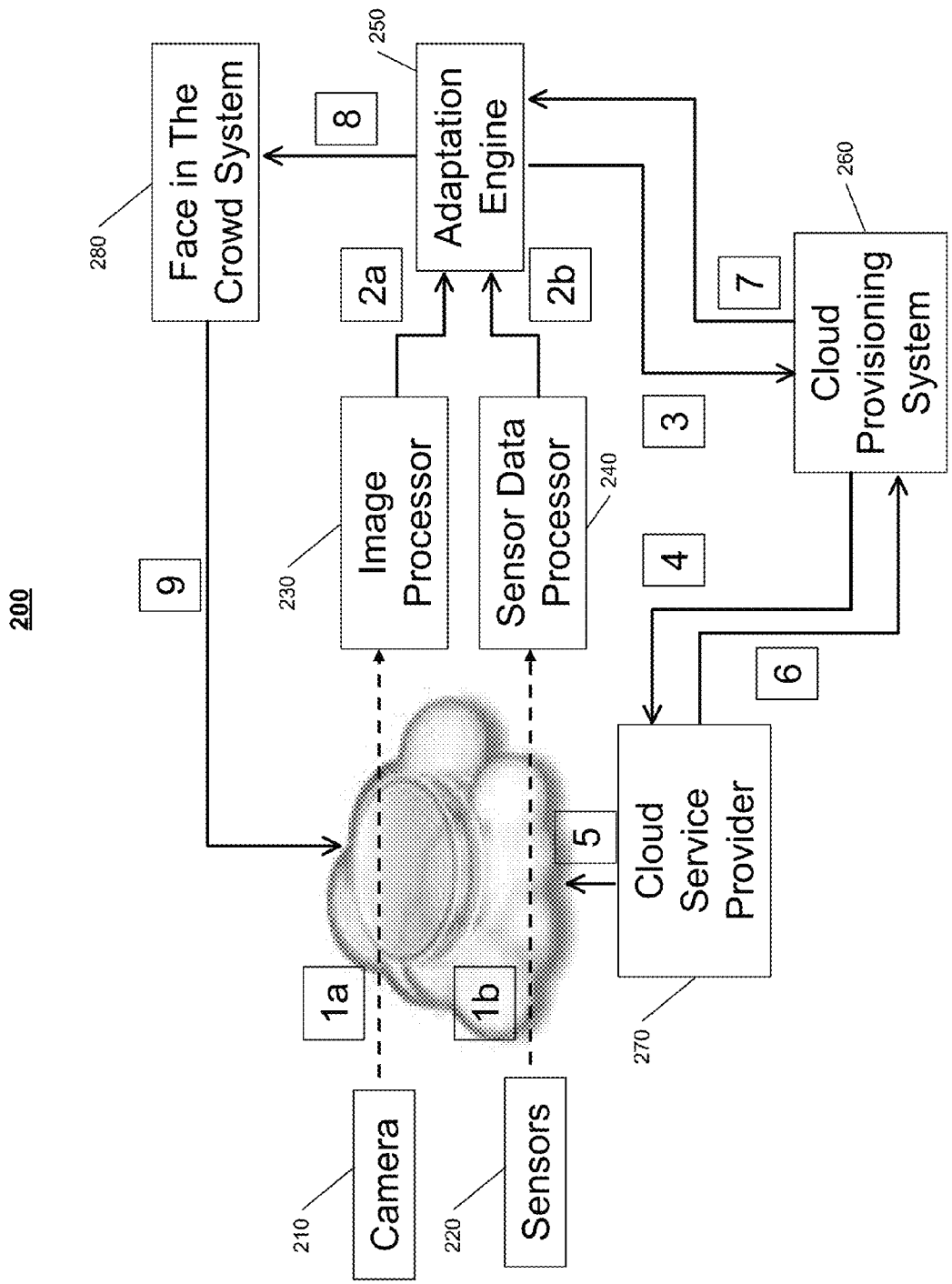
FIGS. 2, 3, and 22 are diagrams of exemplary systems.

FIG. 2 illustrates an exemplary system 200 for performing biometric matching. The system 200 includes one or more cameras 210, one or more sensors 220, an image processor 230, a sensor data processor 240, an adaptation engine 250, a cloud provisioning system 260, a cloud service provider 270, and a Face in the Crowd system 280. The one or more cameras 210 capture one or more images of a target and send the one or more images of the target to the image processor 230. The one or more images captured by the one or more cameras 210 may be images of a crowd in a public location. The one or more sensors 220 sense attributes related to the one or more images captured by the one or more cameras 210. For instance, the one or more sensors 220 may be light intensity sensors and may sense light intensity at a time of capturing the one or more images by the one or more cameras 210. The one or more sensors 220 send the sensed attributes (e.g., light intensity, etc.) to the sensor data processor 240.

The image processor 230 processes the one or more images to determine attributes of the images and/or persons within the one or more images. For instance, the image processor 230 may compute the distance between a person within an image and the camera 210 based on an analysis of the captured image. The image processor 230 also may determine the angle, gender, ethnicity, and any other detectable attributes of a person within the one or more images based on an analysis of the one or more images. The image processor 230 also may determine general characteristics (e.g., blurriness, etc.) of the one or more images based on an analysis of the one or more images.

The sensor data processor 240 processes the sensor data sensed by the one or more sensors 220 to determine attributes related to the one or more images captured by the one or more cameras 210. For instance, the sensor data processor 240 may compute darkness and/or brightness levels related to the one or more images based on output from the one or more sensors 220 (e.g., one or more light intensity sensors). The sensor data processor 240 may determine any attributes related to the one or more images captured by the one or more cameras 210 that are capable of determination by the one or more sensors 220.

The adaptation engine 250 receives output from the image processor 230 and the sensor data processor 240 and, based on the output, determines to allocate a certain number of processors and a certain amount of storage to processing (including pre-processing) images of the target. The adaptation engine 250 sends the determined allocation of the number of processors and the amount of storage to the cloud provisioning system 260. The cloud provisioning system 260 interfaces with the cloud service provider 270 and requests the cloud service provider 270 to allocate the number of processors and the amount of storage. The cloud service provider 270 performs actual provisioning of the number of processors and the amount of storage based on the request from the cloud provisioning system 260. The cloud service provider 270 confirms allocation of the number of processors and the amount of storage to the cloud provisioning system 260 and the cloud provisioning system 260, in turn, confirms allocation of the number of processors and the amount of storage to the adaptation engine 250.

After receiving confirmation of the allocation of the number of processors and the amount of storage, the adaptation engine 250 instructs the Face in the Crowd system 280 to use the allocated number of processors and the amount of storage for processing images of the target. Based on the instructions from the adaptation engine 250, the Face in the Crowd system 280 starts the Face in the Crowd application with the allocated number of processors and the amount of storage. The Face in the Crowd application processes one or more images of the target in parallel in attempting to determine whether the target matches any of the persons in the watch list. As described throughout this disclosure, multiple targets may be processed in parallel and the Face in the Crowd application may process images of multiple, different targets from a crowd in parallel.

Figure 3:
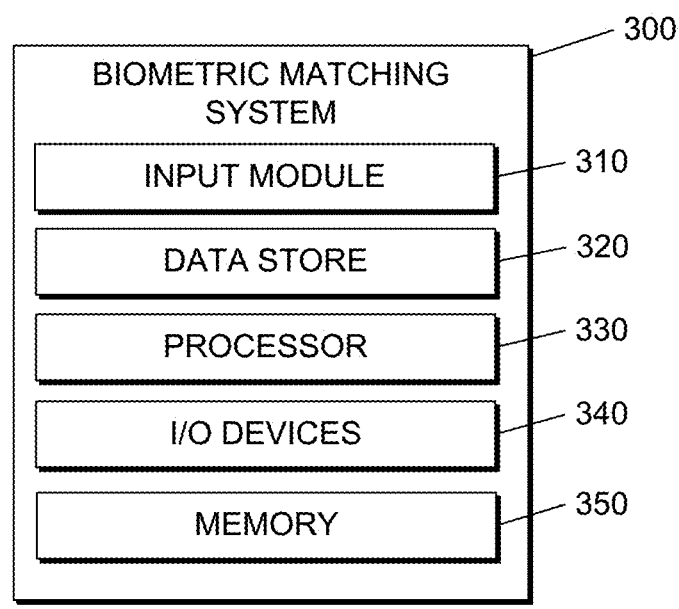

FIG. 3 illustrates an exemplary biometric matching system 300. The system 300 includes an input module 310, a data store 320, one or more processors 330, one or more I/O (Input/Output) devices 340, and memory 350. The input module 320 may be used to input any type of information used in enrolling and verifying biometric data. For example, the input module 310 may be used to receive new biometric data to enroll in a database or receive sample biometric data to verify against biometric data stored in a database. In some implementations, data from the input module 310 is stored in the data store 320. The data included in the data store 320 may include, for example, any type of biometric data (e.g., images of irises, fingerprints, faces, etc.) and similarity scores computed for biometric data. The similarity scores may be used to sort biometric data in the data store 320 using techniques described throughout this disclosure.

In some examples, the data store 320 may be a relational database that logically organizes data into a series of database tables. Each database table in the data store 320 may arrange data in a series of columns (where each column represents an attribute of the data stored in the database) and rows (where each row represents attribute values). In some implementations, the data store 320 may be an object-oriented database that logically or physically organizes data into a series of objects. Each object may be associated with a series of attribute values. In some examples, the data store 320 may be a type of database management system that is not necessarily a relational or object-oriented database. For example, a series of XML (Extensible Mark-up Language) files or documents may be used, where each XML file or document includes attributes and attribute values. Data included in the data store 320 may be identified by a unique identifier such that data related to a particular process may be retrieved from the data store 320.

The processor 330 may be a processor suitable for the execution of a computer program such as a general or special purpose microprocessor, and any one or more processors of any kind of digital computer. In some implementations, the system 300 includes more than one processor 330. The processor 330 may receive instructions and data from the memory 350. The memory 350 may store instructions and data corresponding to any or all of the components of the system 300. The memory 350 may include read-only memory, random-access memory, or both.

The I/O devices 340 are configured to provide input to and output from the system 300. For example, the I/O devices 340 may include a mouse, a keyboard, a stylus, or any other device that allows the input of data. The I/O devices 340 may also include a display, a printer, or any other device that outputs data.

Figure 4:
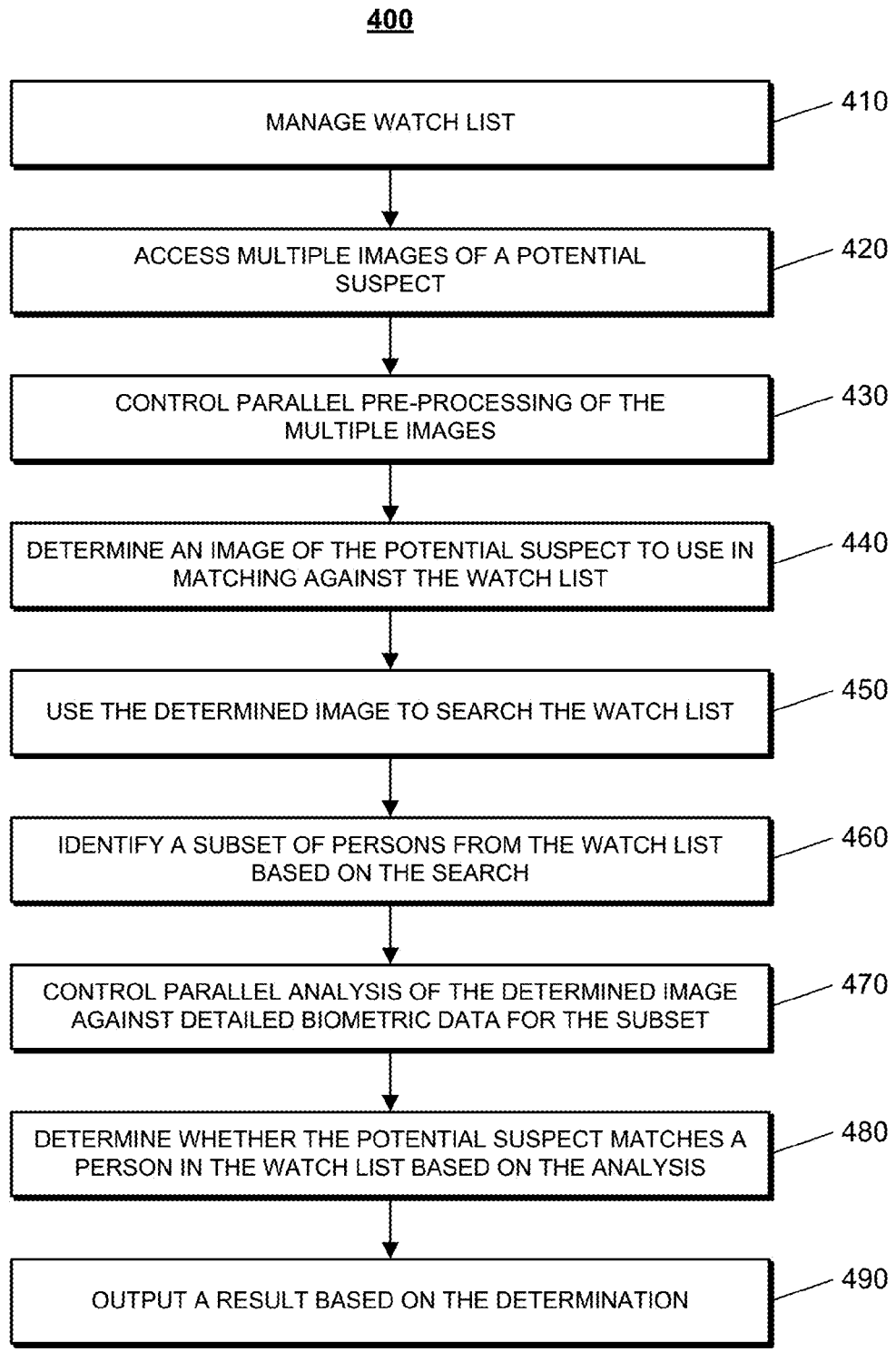
FIGS. 4, 5, 8, 10, 11, 13, and 14 are flowcharts of exemplary processes.

FIG. 4 illustrates a process 400 for performing biometric matching. The operations of the process 400 are described generally as being performed by the system 300. In some implementations, operations of the process 300 may be performed by one or more processors included in one or more electronic devices.

The system 300 manages a watch list (410). For instance, the system 300 manages a watch list of persons of interest that includes biometric data (e.g., a face image) for each of the persons of interest. The watch list may include criminals that a government agency is trying to locate, missing persons, persons blacklisted from an establishment, or any type of persons of interest that an organization would like to locate.

Figure 5:
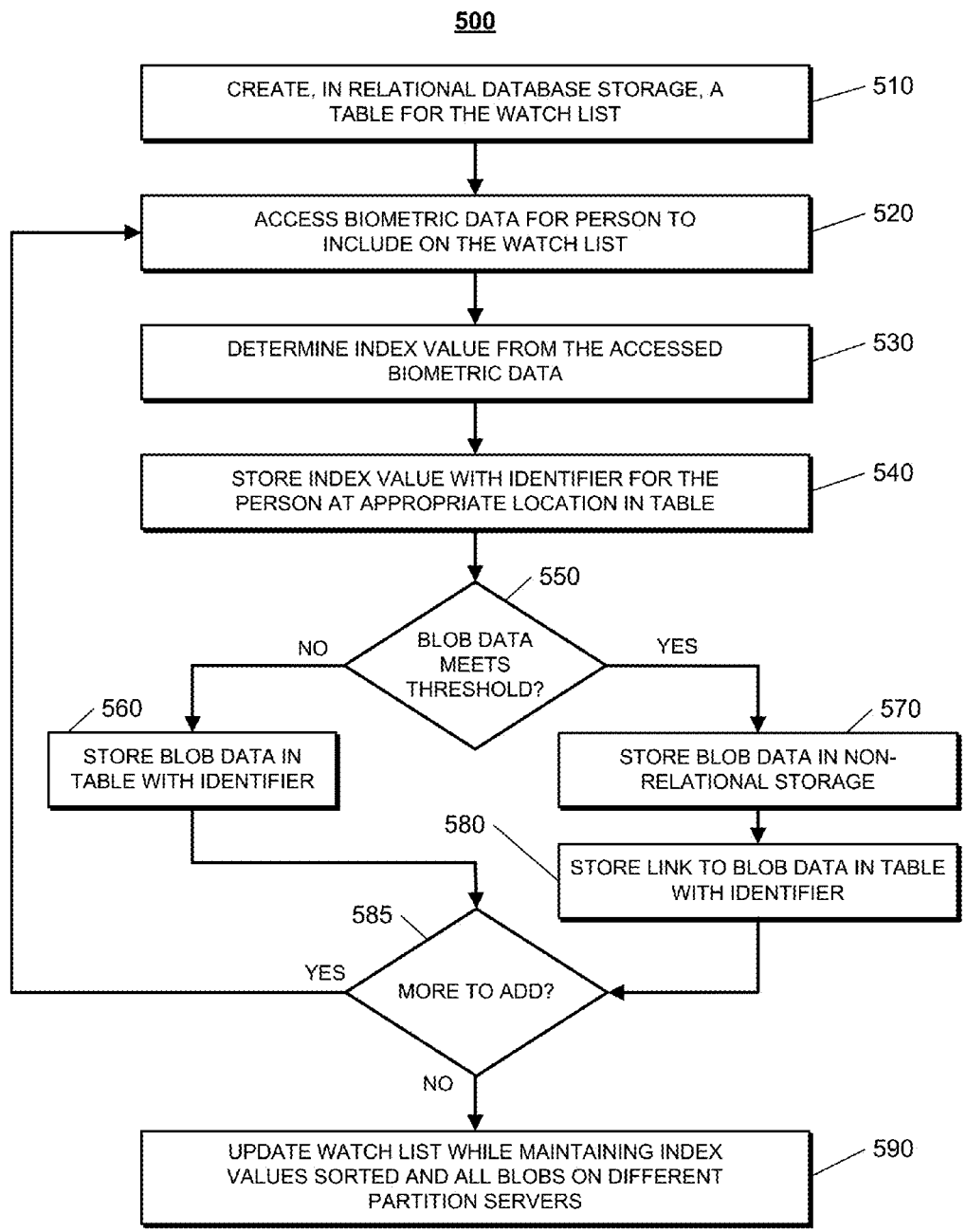

FIG. 5 illustrates a process 500 for managing a watch list. The process 500 may be used in managing a watch list referenced above with respect to reference numeral 410. The operations of the process 500 are described generally as being performed by the system 300. In some implementations, operations of the process 500 may be performed by one or more processors included in one or more electronic devices.

The system 300 creates, in relational database storage, a table for the watch list (510). For instance, the system 300 creates a relational database table that includes columns for information collected in the watch list. The relational database table may include a column that stores a unique identifier for each person in the watch list, a column that stores an index value of biometric data for each person in the watch list, and a column for detailed biometric data for each person in the watch list. The index value of biometric data is a representation of biometric data that is capable of being sorted and may include a similarity score that represents how similar biometric data (e.g., a facial image) for the person in the watch list is to a reference image. The column for detailed biometric data may store the detailed biometric data itself (e.g., blob data of a facial image) or may store a link to the detailed biometric data stored in another location.

The system 300 accesses biometric data for a person to include on the watch list (520). For example, the system 300 receives a biometric image of a person's face. In this example, the system 300 may include or communicate with one or more devices that capture biometric images of a person. The one or more devices may include cameras or any other type of device capable of capturing a biometric image of a person. The system 300 may access the output of any of the one or more devices as the biometric image, in a traditional image format, such as bmp, jpeg, tiff, png, etc.

In some examples, the system 300 accesses the biometric image from electronic storage. In these examples, biometric images may be captured over time at a location separate from the system 300 and stored for later processing and identification. The system 300 also may receive the biometric image over a network.

The system 300 determines an index value from the accessed biometric data (530). For instance, the system 300 determines a representation of the accessed biometric data that may be sorted. The system 300 may determine the index value as a numeric representation of a facial image of the person being added to the watch list.

In some implementations, to determine the index value, the system 300 uses a reference image to compute a similarity score that represents similarity between the accessed biometric image and the reference image. In these implementations, the system 300 accesses the reference image from electronic storage. The reference image may be an image of a face of a reference person. The reference image may be of any reference person as long as the reference image is used in calculating similarity scores for all similarity scores stored in the watch list and then used in searching the similarity scores.

After accessing the reference image, the system 300 compares the accessed facial image with the reference facial image and generates a numeric value that reflects similarity between the accessed facial image and the reference facial image. In these examples, the system 300 may compute the similarity scores between two templates extracted from the two images. The resulting score reflects the similarity between the accessed facial image and the reference facial image in that the score is closer to zero depending how similar the accessed biometric image is to the reference image (i.e., the score would be zero for same images and near to zero for identical images).

Any type of process for computing a similarity score (e.g., numeric value) that reflects similarity between two images may be used. For example, to compute a similarity score between two images, a method for facial matching using zero crossings of a one dimensional Discrete Cosine Transform (DCT) may be used to perform feature extraction for later classification. This coding method is based on differences of discrete cosine transform (DCT) coefficients of overlapped angular patches from normalized facial images. The DCT of a series of averaged overlapping angular patches are taken from normalized facial images and a small subset of coefficients is used to form subfeature vectors. Feature codes are generated as a sequence of many such subfeatures, and classification is carried out using a weighted Hamming distance metric. This technique is described in more detail in 'DCT-based iris recognition', by D. M. Monro, S. Rakshit and D. Zhang, published in IEEE Transactions on Pattern Analysis and Machine Intelligence, Vol. 29, No. 4, pp. 586-595, April 2007.

In addition, other face matching techniques may be used in determining an index value (e.g., computing a similarity score that reflects similarity between two images). For example, the system 300 may employ face matching techniques that use Singular Value Decomposition and Radial Basis Function using Neural Networks. These techniques are described in more detail in 'Face Verification Based on Singular Value Decomposition and Radial Basis Function Neural Network,' by Yunhong Wang, Tieniu Tan and Yong Zhu, National Laboratory of Pattern Recognition, Institute of Automation, Chinese Academy of Sciences, Beijing, P. R. China, 100080 published at http://www.cbsr.ia.ac.cn/publications/yhwang/
Face%20Verification%20Based%20on%20Singular%20
Value%20Decomposition%20and%20Radial%20Basis%20
Function%20Neural%20Network.pdf. The system 300 also may employ face matching techniques that perform Face Verification using locally adaptive regression kernel (LARK) representation. These techniques are described in more detail in 'Face Verification Using the LARK Representation,' by Hae Jong Seo, Student Member, IEEE, Peyman Milanfar, Fellow, IEEE, published at http://users.soe.ucsc.edu/~milanfar/publications/journal/TIFS_Final.pdf.

In some examples, the system 300 may access multiple biometric images of the face of the person being added to the watch list and compute, for each of the multiple biometric images, a similarity score that represents similarity between the corresponding biometric image and the reference image. In these examples, the system 300 may determine an average similarity score or median similarity score based on the similarity scores computed for the multiple biometric images. Using multiple biometric images of the face of the person may provide a more accurate similarity score and may account for slight differences in position when capturing biometric images of the person as compared to position in the reference image.

In some implementations, the system 300 may use one or more image similarity processes to generate a similarity measure between the accessed biometric image and the reference image. In these implementations, the system 300 may normalize the similarity measure to a similarity score between zero and one. Normalization allows the system 300 to use a similarity process that produces a measure outside of a desired scale. In addition, normalization may allow different similarity processes with different output ranges to be used and may allow for changes in the similarity process as long as the normalization is adjusted to compute similarity scores within the desired range (e.g., zero to one).

The system 300 stores the index value with an identifier for the person at an appropriate location in the table (540). For example, the system 300 identifies an appropriate row in the table created in the relational database storage based on the index value. In this example, the appropriate row in the table is the row that maintains the index values within the table in a sorted manner. The system 300 may compare the index value with other index values already sorted in the watch list table (if any) and, based on the comparison, finds the row where the index value belongs in the sorted list. If the index values are numeric and sorted in ascending order, the system 300 identifies the first row as the appropriate row when the system 300 determines that the index value is lower than all of the other index values in the table, identifies the last row as the appropriate row when the system 300 determines that the index value is higher than all of the other index values in the table, or identifies a row where the index value falls between two adjacent index values in the sorted list. If the index values are numeric and sorted in descending order, the system 300 identifies the first row as the appropriate row when the system 300 determines that the index value is higher than all of the other index values in the table, identifies the last row as the appropriate row when the system 300 determines that the index value is lower than all of the other index values in the table, or identifies a row where the index value falls between two adjacent index values in the sorted list.

After identifying the appropriate location (e.g., row) within the table, the system 300 stores a unique identifier of the person at the appropriate location (e.g., row) in a field (e.g., column) used to store unique identifiers. The system 300 also stores the index value at the appropriate location (e.g., row) in a field (e.g., column) used to store index value. Because the system 300 stores the unique identifier and the index value at the same location (e.g., the same row), the unique identifier and the index value are associated with one another.

The system 300 determines whether blob data for the person meets a threshold storage size (550). For instance, the system 300 accesses blob data for the person and determines an amount of storage needed to store the accessed blob data. The accessed blob data may represent the facial image of the person and may be the accessed biometric data used to determine the index value for the person. After determining the storage size of the blob data as the amount of storage needed to store the accessed blob data, the system 300 accesses the threshold storage size, compares the determined storage size of the blob data to the threshold storage size, and determines whether the blob data meets the threshold storage size based on the comparison. The threshold storage size may be a preset value (e.g., one megabyte) or may be dynamically determined based on the current storage and access characteristics of the one or more databases being used to store blob data.

Based on a determination that the blob data for the person does not meet the threshold storage size, the system 300 stores the blob data in the table with the identifier (560). For instance, the system 300 stores the blob data for the person at the appropriate location (e.g., row) in the table in a field (e.g., column) used to store blob data or links to blob data. In storing the blob data in the table, the system 300 converts the blob data from an object representation to a data representation needed for storage in the relational database table. In this regard, the system 300 serializes the blob data for storage in the relational database table and then deserializes the stored data representation back to the object format when extracting the blob data from the relational database table. Although the serialization and deserialization of the data takes processing, the performance impact is not significant because the data size is relatively small and lower than the threshold storage size. In fact, the processing needed for serialization and deserialization of the data may be more efficient than the processing needed to access a link from the relational database table and then use the accessed link to access the blob data in an object format directly from another non-relational storage system. Accordingly, the system 300 sets the threshold storage size based on the processing time needed for the serialization and deserialization of the data as compared to the processing time needed to access a link from the relational database table and then use the accessed link to access the blob data in an object format directly from another non-relational storage system. The system 300 sets the threshold storage size such that blob data is stored in the relational database table, unless the storage size of the blob data causes the serialization and deserialization of the blob data to impact performance as compared to the processing time needed to access a link from the relational database table and then use the accessed link to access the blob data in an object format directly from another non-relational storage system. Because the system 300 stores the unique identifier and the blob data at the same location (e.g., the same row), the unique identifier and the blob data are associated with one another.

Based on a determination that the blob data for the person meets the threshold storage size, the system 300 stores the blob data in non-relational storage (570) and stores a link to the blob data in the table with the identifier (580). For instance, the system 300 stores the blob data for the person in a non-relational storage system and determines an address at which the blob data is stored in the non-relational storage system. In storing the blob data in the non-relational storage system, the system 300 causes the blob data to be stored on a separate partition server from all other instances of blob data that are in the watch list and that are stored in the non-relational storage system. By maintaining all instances of blob data on separate partition servers, the system 300 ensures that all instances of blob data can be accessed simultaneously in parallel, which enables true parallel processing to be performed on the images in the watch list.

The system 300 may ensure that all instances of blob data are stored on separate partition servers by controlling naming conventions for each instance of blob data in a manner that causes the cloud service provider providing the non-relational storage system to store each instance of blob data on a different partition server. For instance, the system 300 may assign each blob a unique key which is composed of its container name and blob name. This key is used as a partitioning key, which assigns the blob to one partition server. The access to each partition server is load-balanced and all the partition servers use a common distributed file system. With this approach, concurrent access to all of the images at the same time is possible (as they are on different partition servers) and the system 300 may run parallel matching processes for same suspect as well as for different suspects in parallel. This concurrent parallel matching cannot be performed by using of relational databases. Any other techniques to control storage of each instance of blob data on a different partition server may be used.

Another aspect of a cloud storage system that provides non-relational storage is that it allows blobs to be divided into blocks and these blocks are stored and retrieved in parallel from the blob storage. In this regard, the system 300 may retrieve each blob in a faster way by retrieving blocks in parallel.

After storing the blob data for the person in the non-relational storage system and determining the address at which the blob data is stored in the non-relational storage system, the system 300 stores a link to the address at which the blob data is stored at the appropriate location (e.g., row) in the table in a field (e.g., column) used to store blob data or links to blob data. Because the system 300 stores the unique identifier and the blob data at the same location (e.g., the same row), the unique identifier and the blob data are associated with one another.

The system 300 determines whether another person needs to be added to the watch list (585). Based on a determination that another person needs to be added to the watch list, the system 300 repeats the process of storing an index value and blob data for the person, as described above with respect to reference numerals 520 to 580. The system 300 continues to add additional persons to the watch list until all persons have been added to the watch list.

Based on a determination that another person does not need to be added to the watch list, the system 300 updates the watch list while maintaining index values sorted in the watch list and maintaining all blobs stored on different partition servers (590). For instance, when a new person is added to the watch list, the system 300 performs the operations described at reference numerals 520 to 570 to add the new person at the appropriate location in the watch list and to, if the threshold storage size is met, store blob data for the new person on a separate partition server from partition servers used to store all other instances of blob data for persons in the watch list. The system 300 may routinely verify that the watch list remains sorted in a proper manner and that all instances of blob data are stored on different partition servers. To the extent the verification reveals that the watch list is not properly sorted or that all instances of blob data are not stored on different partition servers, the system 300 corrects any issues by re-sorting the watch list and redistributing the blob data within the non-relational storage system.

Figure 6:
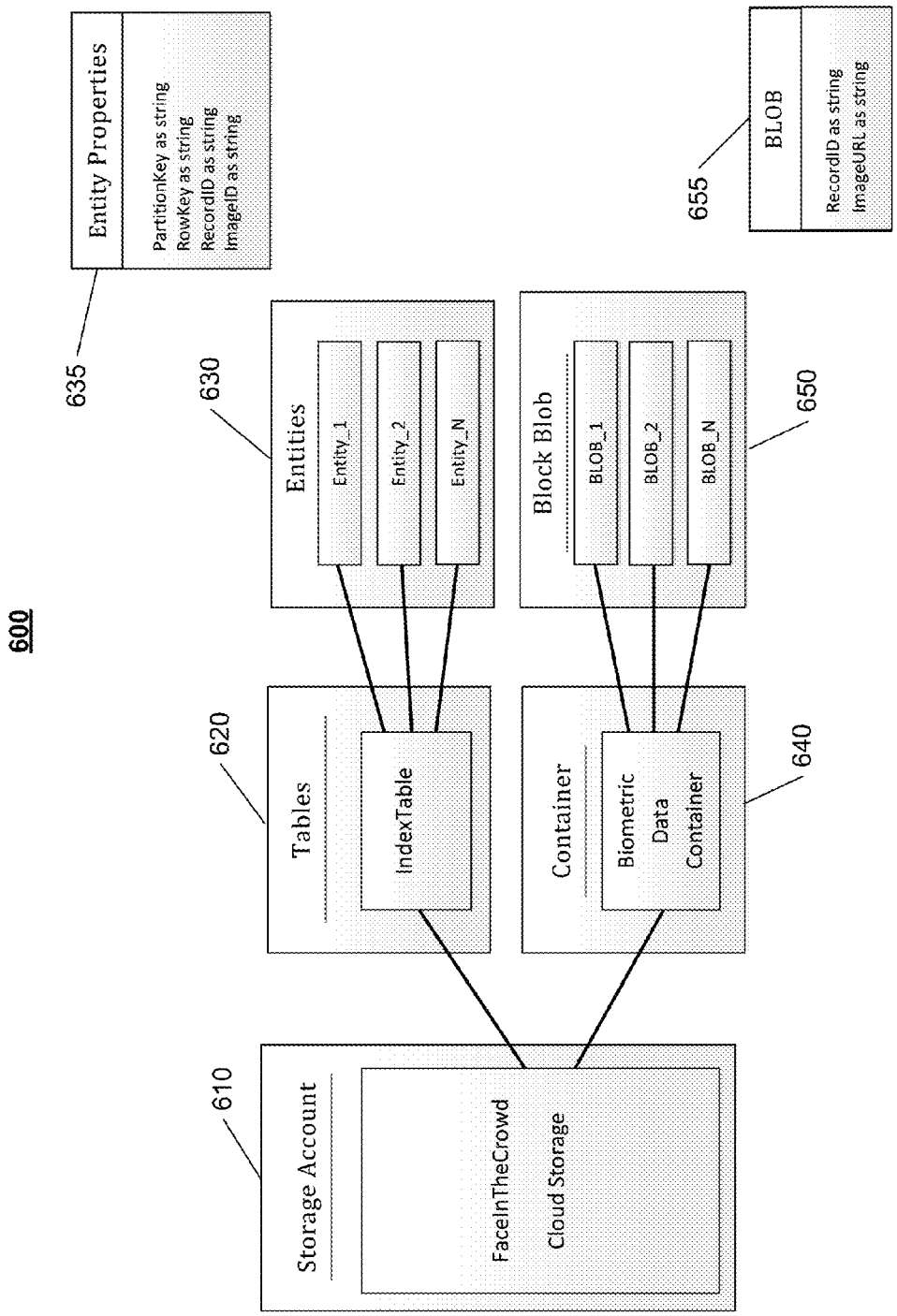
FIG. 6 illustrates an exemplary data storage design for a watch list.

FIG. 6 illustrates an exemplary data storage design 600 for a watch list. As shown in FIG. 6, the system 300 accesses a cloud storage system through a storage account 610. The storage account 610 is a unique valid account to access the cloud storage system. The storage account 610 may have a 256-bit secret key which is used to authenticate user requests to the cloud storage system.

The storage account 610 includes table storage 620 and blob storage 640. The table storage 620 supports massively scalable tables in the cloud, which may include billions of entities and terabytes of data. Given the vast amount of storage, the system 300 may efficiently scale out by automatically scaling to thousands of servers as traffic grows. The table storage 620 is used to store the index table for the watch list. The index table includes a set of entities 630. Table names are scoped by the account. An application may create many tables within a storage account. A table does not have a fixed schema, allowing tables to store entities with different type of properties.

The entities 630 (which are analogous to "rows" in a table) are the basic data items stored in a table. An entity contains a set of properties. Each table has two properties that form the unique key for the entity. An entity is dissimilar from a row in a relational database like a structured query language (SQL) database as it need not have a fixed structure. Each entity in a table can be different with other entity in terms of the structure of properties. A property (which is analogous to a "column" in a table) represents a single value in an entity. Property names are case sensitive and a rich type set is supported for property values.

A PartitionKey is the first key property of every table. The system 300 uses the PartitionKey to automatically distribute the table's entities over many storage nodes. The entities having the same partition keys are stored on the same node. In some examples, the face images of similar group/type will be assigned the same partition key. To be more specific, each index profile is assigned a different partition key. For instance, the watch list of a particular country or region may be assigned the same partition key.

A RowKey is the second key property for the table. The RowKey is the unique ID of the entity within the partition it belongs to. The PartitionKey combined with the RowKey uniquely identifies an entity in a table. In some examples, the index values (e.g., similarity scores) are considered as the RowKey.

Every entity has a version maintained by the system 300 and includes a timestamp related to the entity's creation and/or updates. A Partition includes a set of entities in a table with the same partition key value. The sort order is a single index, where all entities in a table are sorted by PartitionKey and then RowKey. In this regard, queries specifying these keys are more efficient, and all results are returned sorted by PartitionKey and then by RowKey.

As shown, FIG. 6 illustrates an example set of entity properties 635 for the index table. The entity properties 635 include a PartitionKey as a string in which the database category is considered as the PartitionKey. The entity properties 635 also include a RowKey where the computed index value of an image is considered as the RowKey. The entity properties 635 further include a RecordID, which is a field that assigns a unique RecordID for each identity, and an ImageURL, which is a field that stores the uniform resource locator (URL) for the corresponding blob. The ImageURL is the property used to link the table and the blob images.

The blob storage 640 enables applications to store large objects, up to 50 GB each in the cloud. The blob storage 640 supports a massively scalable blob system, where hot blobs are served from many servers to scale out and meet the traffic needs of the application. A container in the blob storage 640 provides a grouping of a set of blobs 650. The container name is scoped by the account. Sharing policies are set at the container level. "Public READ" and "Private" are supported. When a container is "Public READ", all of its contents may be read by anyone without requiring authentication. When a container is "Private," only the owner of the corresponding account may access the blobs in that container with authenticated access. Containers also may have metadata associated with them. Metadata may be in the form of <name, value> pairs, and may be up to 8 KB in size per container. The ability to list all of the blobs within the container is also provided.

Blobs are stored in and scoped by Blob Containers. Each blob may be up to 50 GB. A blob has a unique string name within the container. Blobs may have metadata associated with them, which may be <name, value> pairs, and may be up to 8 KB in size per blob. The blob metadata may be retrieved and set separately from the blob data bits.

As shown, FIG. 6 illustrates an example blob format 655 for blobs stored in the blob storage 640. The blob format 655 includes an ImageURL as a string, which is the URL for the image stored as a blob. The blob format 655 also includes a RecordID as a string, which is a field stored as a metadata with a blob. All access to a blob is done through a standard HTTP REST PUT/GET/DELETE interface. Blobs may be accessed via PUT and GET by using the appropriate URL. Together the container name and the blob name form a unique partition key which causes each blob to be stored on a different partition server. By setting the container name and the blob name to cause each blob to be stored on a different partition server, the system 300 is able to concurrently access each blob and perform parallel accessing of each blob.

Figure 7:
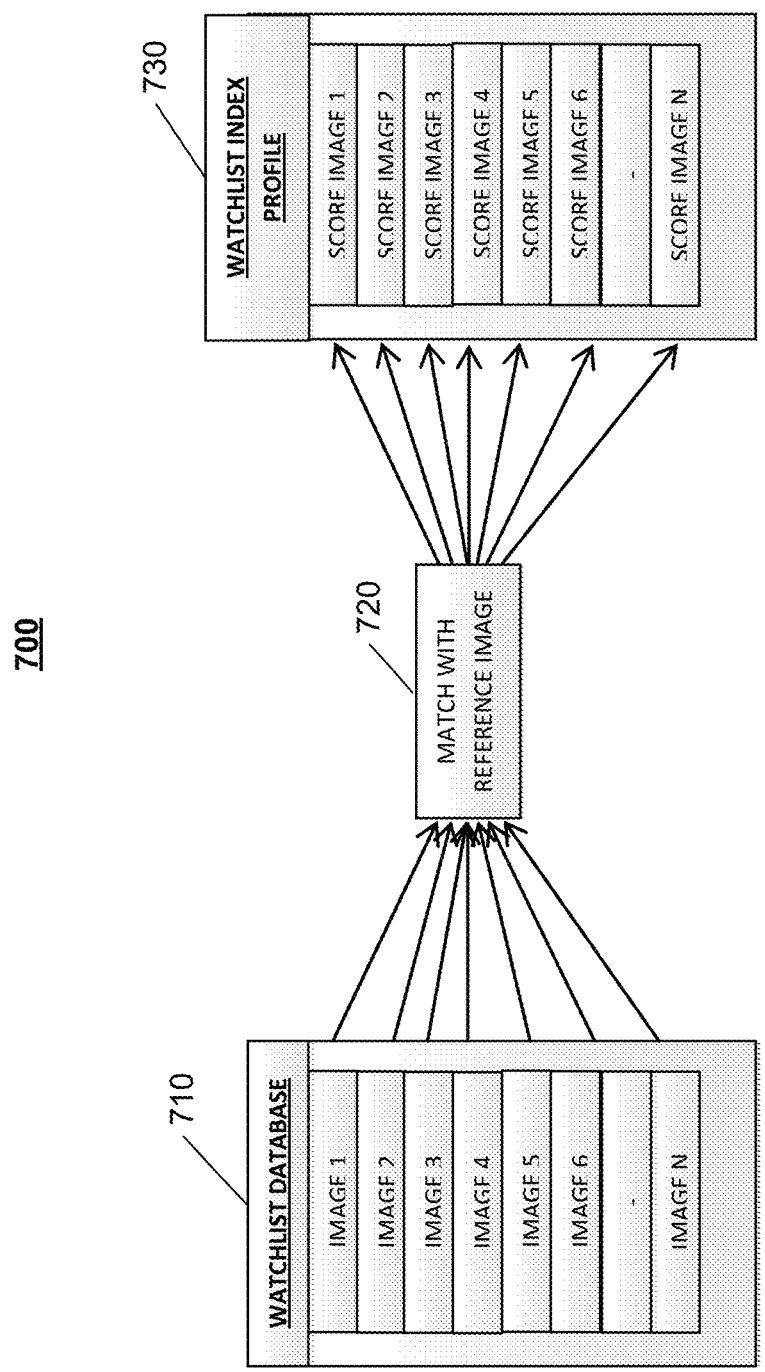
FIG. 7 illustrates an exemplary watch list.

FIG. 7 illustrates an exemplary watch list. As shown in FIG. 7, a watch list database 710 includes images of each person in the watch list. The watch list database 710 may be a non-relational database and the images may be stored as blobs in the non-relational database. A reference image 720 is used to generate a watch list index profile 730. The watch list index profile 730 is a list of match scores for all of the images in the watch list database 710. Each watch list database image has a match score that is obtained by matching the image with the reference image 720. The match score (e.g., similarity score) may be referred to as the index of the image. The match scores in the watch list index profile 730 are sorted to allow for efficient searching of the match scores using a search process that leverages knowledge of how the match scores are sorted. For instance, the match scores may be sorted in ascending order and may be searched using a binary search process. For a particular index profile, the reference image is always the same. Multiple index profiles may be created using multiple, different reference images.

Referring again to FIG. 4, the system 300 accesses multiple images of a potential suspect (420). For example, the system 300 receives multiple biometric images of a person's face. In this example, the system 300 may include or communicate with one or more devices that capture biometric images of a person. The one or more devices may include cameras or any other type of device capable of capturing a biometric image of a person. The system 300 may access the output of any of the one or more devices as the biometric image, in a traditional image format, such as bmp, jpeg, tiff, png, etc.

In some implementations, the multiple images of the potential suspect may be multiple images of a crowd with many potential suspects taken successively in time (e.g., images of the crowd taken about every second). In these implementations, the system 300 analyzes the multiple images of the crowd to identify a single potential suspect within each of the images of the crowd. After the system 300 identifies the single potential suspect within each of the images of the crowd, the system 300 extracts a portion of each of the multiple images of the crowd that includes the single potential suspect and accesses the extracted portions of the multiple images as the multiple images of the potential suspect.

In some examples, the system 300 accesses the multiple biometric images from electronic storage. In these examples, biometric images may be captured over time at a location separate from the system 300 and stored for later processing and identification. The system 300 also may receive the multiple biometric images over a network.

The system 300 controls parallel pre-processing of the multiple images (430). For example, the system 300 takes each of the multiple images and performs pre-processing of each of the multiple images in parallel. In this example, the system 300 may requisition processing resources from a cloud service provider and control the processing resources from the cloud service provider to pre-process the multiple images in parallel.

In some situations, the number of multiple images may be too large to justify pre-processing all of the multiple images in parallel. In these situations, the system 300 determines to pre-process the multiple in multiple batches. In this regard, the system 300 divides the multiple images in several batches, selects a first batch of images for pre-processing, controls pre-processing of the images in the first batch in parallel, and, after completion, continues to iteratively perform parallel pre-processing of images in the remaining batches until all of the multiple images have been pre-processed.

The system 300 may perform any types of pre-processing operations. For instance, system 300 may use any type of image processing technique in an attempt to enhance the quality of the images to enhance the quality of the images and achieve the best images to use in facial matching. The system 300 also may consider aspects of several of the multiple images and derive an enhanced representation of the potential suspect based on features captured in several different images. For example, the system 300 may fill in a shadow on an otherwise good image of the potential suspect's face using a portion of another image of the potential suspect's face. In pre-processing, the system 300 attempts to enhance the quality of the facial images of the potential suspect and generate the best possible representation of the potential suspect's face by selecting the best image from among the enhanced versions of the multiple images or using a combination of the enhanced versions of the multiple images. The stages of pre-processing the system 300 may use in attempting to enhance the quality of the facial images of the potential suspect include contrast enhancement, blur removal, brightness adjustment (increase/decrease as appropriate), skin tone enhancement, or any other type of pre-processing that enhances quality of a facial image.

Figure 8:
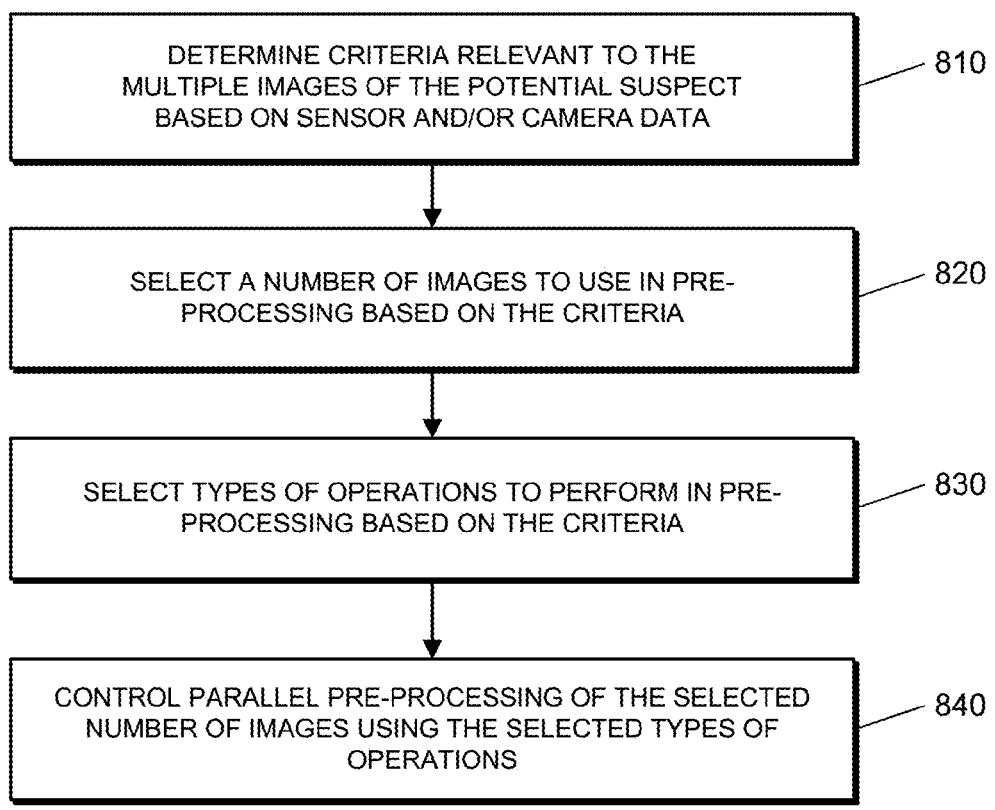

FIG. 8 illustrates a process 800 for pre-processing images. The process 800 may be used in controlling parallel pre-processing of the multiple images referenced above with respect to reference numeral 430. The operations of the process 800 are described generally as being performed by the system 300. In some implementations, operations of the process 800 may be performed by one or more processors included in one or more electronic devices.

The system 300 determines criteria relevant to the multiple images of the potential suspect based on sensor and/or camera data (810). For example, the system 300 may access sensor data captured in conjunction with capturing of the multiple images and analyze the accessed sensor data to determine criteria relevant to the captured images. In this example, the sensor data may be sensor data captured by a light level sensor and/or a proximity sensor that senses distances of objects from the camera capturing the image (e.g., a time of flight sensor). The system 300 may analyze the light level sensor and/or the proximity sensor data and determine a light level at a time when the multiple images were captured and/or a distance of one or more objects (e.g., persons) within the multiple images based on the analysis.

In some implementations, the system 300 may analyze the camera data (e.g., the multiple images) and determine criteria relevant to the captured images based on the analysis. In these implementations, the system 300 may analyze the camera data to determine a distance of one or more objects (e.g., persons) within the multiple images. The system 300 also may analyze faces detected within the multiple images and determine whether features of the detected faces have characteristics that suggest the face is of a female or a male. In this regard, the system 300 may determine the gender of the detected faces within the multiple images. The system 300 further may perform skin tone processing of faces detected within the multiple images and determine ethnicity of persons within the multiple images based on the skin tone processing.

In some examples, the system 300 may consider a combination of the sensor data and the camera data in determining criteria relevant to the multiple images of the potential suspect. In these examples, the system 300 may determine a distance of one or more objects (e.g., persons) within the multiple images based on sensor data from a proximity sensor and then confirm the measured distances or that the objects are in fact persons based on analysis of the camera data. Based on the sensor data and/or the camera data, the system 300 may determine lighting conditions, distance of persons in the multiple images, camera angle with respect to persons in the multiple images, gender of persons in the multiple images, ethnicity of persons in the multiple images, and any other criteria relevant to the multiple images of the potential suspect that assists in informing processing needed on the multiple images.

The system 300 selects a number of images to use in pre-processing based on the criteria (820). For example, the system 300 considers the criteria determined (e.g., lighting conditions, distance, camera angle, gender, ethnicity, etc.) and selects the number of images to use in pre-processing based on the criteria determined. In this example, the system 300 selects the number of images that are needed or would be beneficial in determining an image to use in matching based on the criteria determined. For instance, when the lighting conditions are relatively poor and the distance of the person is relatively far from the camera, the system 300 selects a relatively high number of images to use in pre-processing because the criteria suggests that determining an image of sufficient quality will be relatively difficult and a large number of images would be beneficial. When the lighting conditions are relatively good and the distance of the person is relatively near the camera, the system 300 selects a relatively low number of images to use in pre-processing because the criteria suggests that determining an image of sufficient quality will be relatively easy and a sufficient image is likely to be determined in the low number of images. To determine the number of images to use in pre-processing, the system 300 may reference a look-up table that stores a number of images to use in pre-processing for the various possible values (or value ranges) for the criteria used by the system 300 to select the number of images. The system 300 may store the look-up table in electronic storage based on user input provided by an operator of the system 300.

FIG. 9 illustrates example data structures 910 and 920 used in selecting a number of images to use in pre-processing. As shown in FIG. 9, a first data structure 910 defines a number of images to use in pre-processing based on lighting conditions of the images and a second data structure 920 defines a number of images to use in pre-processing based on a distance of the potential suspect from the camera in the images. The first data structure 910 and the second data structure 920 may be used separately or in combination.

The system 300 references the first data structure 910 and/or the second data structure 920 in selecting a number of images to use in pre-processing. For example, the system 300 determines lighting conditions of the images based on output from a light sensor positioned at a location where the images were captured or based on analysis of the images themselves. In this example, the system 300 determines whether the images were taken with no noticeable light, were taken at night with dim light, were taken indoors, or were taken in daylight. Based on the determination, the system 300 references the first data structure 910 and selects the number of images to use in pre-processing defined by the first data structure 910. For instance, the system 300 selects fifty images based on determining that the images were taken with no noticeable light, selects twenty images based on determining that the images were taken at night with dim light, selects ten images based on determining that the images were taken indoors, and selects five images based on determining that the images were taken at in daylight.

In another example, the system 300 determines a distance of the potential suspect from the camera in the images based on output from a distance sensor positioned at the camera or based on analysis of the images themselves. In this example, the system 300 determines whether the potential suspect is more than two hundred yards away from the camera, between one hundred to two hundred yards away from the camera, between fifty to one hundred yards away from the camera, or less than fifty yards away from the camera. Based on the determination, the system 300 references the second data structure 920 and selects the number of images to use in pre-processing defined by the second data structure 920. For instance, the system 300 selects fifty images based on determining that the potential suspect is more than two hundred yards away from the camera, selects twenty images based on determining that the potential suspect is between one hundred to two hundred yards away from the camera, selects ten images based on determining that the potential suspect is between fifty to one hundred yards away from the camera, and selects five images based on determining that the potential suspect is less than fifty yards away from the camera.

The system 300 selects types of operations to perform in pre-processing based on the criteria (830). For example, the system 300 considers the criteria determined (e.g., lighting conditions, distance, camera angle, gender, ethnicity, etc.) and selects the types of operations to perform in pre-processing based on the criteria determined. In this example, the system 300 selects the stages of pre-processing to perform from among stages including contrast enhancement, blur removal, brightness adjustment (increase/decrease as appropriate), skin tone enhancement, or any other type of pre-processing that enhances quality of a facial image.

The system 300 selects the types of operations that are needed or would be beneficial in determining an image to use in matching based on the criteria determined. For instance, when the lighting conditions are relatively poor and the distance of the person is relatively far from the camera, the system 300 selects a relatively large number of operations to use in pre-processing because the criteria suggests that determining an image of sufficient quality will be relatively difficult and a large amount of pre-processing would be beneficial. When the lighting conditions are relatively good and the distance of the person is relatively near the camera, the system 300 selects a relatively low number of operations to use in pre-processing because the criteria suggests that determining an image of sufficient quality will be relatively easy and a sufficient image is likely to be determined without a large amount of pre-processing. To determine the types of operations to use in pre-processing, the system 300 may reference a look-up table that stores operations to use in pre-processing for the various possible values (or value ranges) for the criteria used by the system 300 to select the number of images. The system 300 may store the look-up table in electronic storage based on user input provided by an operator of the system 300. For instance, the system 300 may use data structures similar to the data structures 910 and 920 discussed above with respect to FIG. 9 to determine the operations to use in pre-processing.

The system 300 controls parallel pre-processing of the selected number of images using the selected types of operations (840). For instance, the system 300 accesses (e.g., captures) the selected number of images of the potential suspect and performs the selected types of pre-processing operations (e.g., one or more of contrast enhancement, blur removal, brightness adjustment, skin tone enhancement, etc.) on the accessed images. The system 300 may control the pre-processing of the accessed images in parallel using processing resources requisitioned from a cloud service provider.

Referring again to FIG. 4, the system 300 determines an image of the potential suspect to use in matching against the watch list (440). For example, the system 300 analyzes the enhanced versions of the multiple images that result from pre-processing and, for each image, determines a quality score that reflects the quality of the corresponding image of the potential suspect's face. In this example, the system 300 compares the determined quality scores and selects the image having the highest quality score to use in matching against the watch list.

In some examples, the system 300 may consider aspects of several of the multiple images and derive an enhanced representation of the potential suspect based on features captured in several different images. In these examples, the system 300 may fill in a shadow on an otherwise good image of the potential suspect's face using a portion of another image of the potential suspect's face. The system 300 may attempt to generate the best possible representation of the potential suspect's face using a combination of the enhanced versions of the multiple images that result from pre-processing. For instance, the system 300 may take small portions of several of the images and generate a new image that reflects a combination of the information captured in the several images. In this regard, the system 300 may generate a new composite image of the potential suspect that is better than any of the captured images alone.

In some implementations, the system 300 may determine whether to perform processing of a combination of the enhanced versions of the multiple images that result from pre-processing based on whether any of the enhanced versions of the multiple images are of sufficient quality. In these implementations, the system 300 may identify the image having the highest quality score as discussed above and determine whether the image having the highest quality score is of sufficient quality. For instance, the system 300 may compare the highest quality score to a quality threshold and, based on the comparison, determine whether the highest quality score meets the quality threshold. Based on a determination that the highest quality score meets the quality threshold, the system 300 determines that the image having the highest quality score is of sufficient quality and omits processing of a combination of the enhanced versions of the multiple images. Based on a determination that the highest quality score does not meet the quality threshold, the system 300 determines that the image having the highest quality score is of insufficient quality and performs processing of a combination of the enhanced versions of the multiple images in an attempt to generate a new image that is of better quality.

The system 300 uses the determined image to search the watch list (450) and identifies a subset of persons from the watch list based on the search (460). For example, the system 300 computes an index value of the determined image and uses the computed index value to search the sorted list of index values in the watch list in a manner that leverages knowledge of how the index values are sorted (e.g., ascending or descending order). In this example, the system 300 may discard multiple potential matches (perhaps many potential matches) with a single comparison based on the knowledge of how the index values are sorted. A binary search process or any other search process described throughout this disclosure may be used.

Based on results of the searching, the system 300 identifies a subset of persons in the watch list that are each associated with an index value within a threshold of the computed index value. The system 300 may identify the subset of persons by identifying index values whose absolute difference from the computed index value is less than or equal to the threshold. If the index values were not sorted, the system 300 would have to compare the computed index value against all of the index values to ensure each appropriate person is found. However, because the index values are sorted, the system 300 may find the subset of people more quickly by discarding multiple index values using a single comparison and knowledge of how the index values are sorted. As described throughout this disclosure, the system 300 may compute the index value as a similarity score that reflects similarity of the determined image to a reference image used to generate the sorted similarity scores within the watch list.

Figure 10:
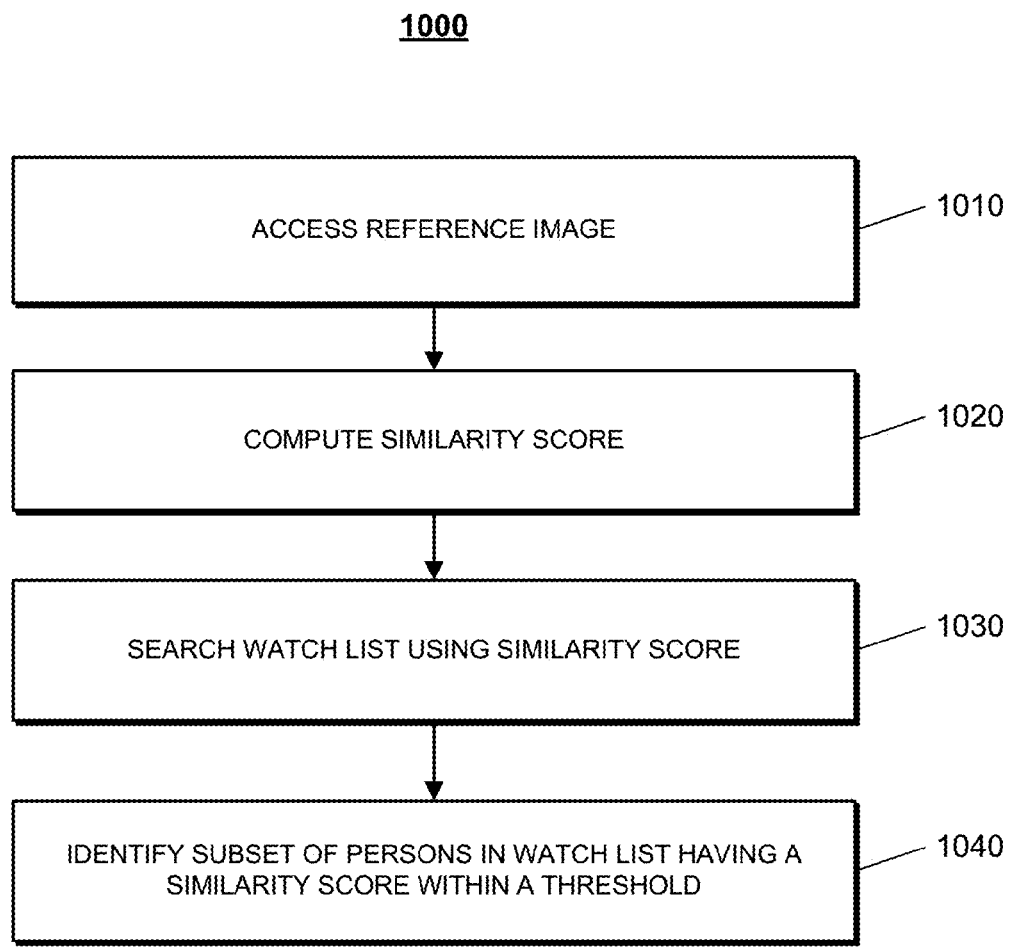

FIG. 10 illustrates a process 1000 for search a watch list. The process 1000 may be used in using the determined image to search the watch list and identifying a subset of persons from the watch list referenced above with respect to reference numerals 450 and 460. The operations of the process 1000 are described generally as being performed by the system 300. In some implementations, operations of the process 1000 may be performed by one or more processors included in one or more electronic devices.

The system 300 accesses a reference image (1010). For instance, the system 300 accesses the reference image from electronic storage. The reference image may be an image of a face of a reference person. The reference image may be of any reference person as long as the reference image is used in calculating similarity scores for all similarity scores being searched.

Figure 11:
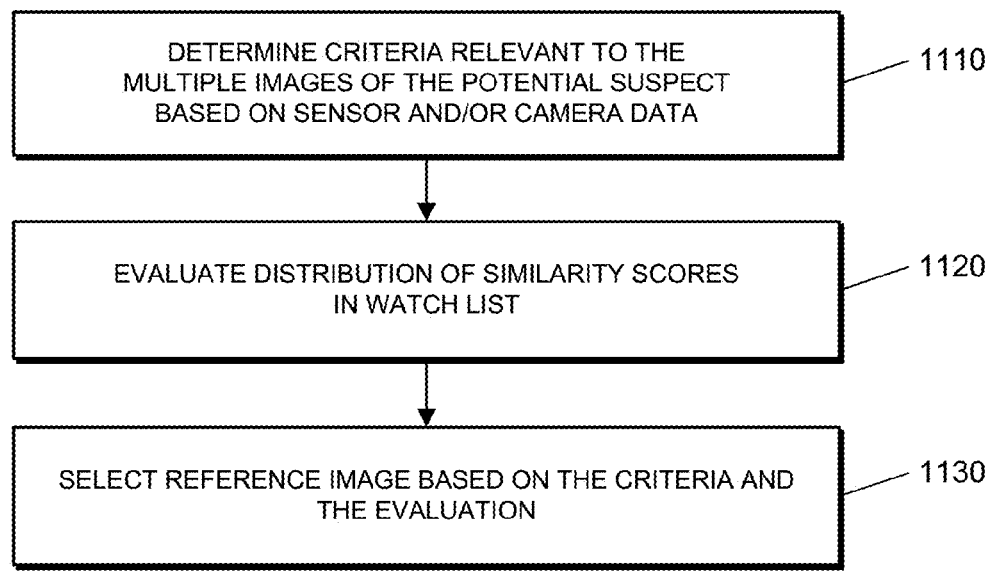

FIG. 11 illustrates a process 1100 for accessing a reference image. The process 1100 may be used in accessing a reference image referenced above with respect to reference numeral 1010. The operations of the process 1100 are described generally as being performed by the system 300. In some implementations, operations of the process 1100 may be performed by one or more processors included in one or more electronic devices.

The system 300 determines criteria relevant to the multiple images of the potential suspect based on sensor and/or camera data (1110). For example, the system 300 may access sensor data captured in conjunction with capturing of the multiple images and analyze the accessed sensor data to determine criteria relevant to the captured images. In this example, the sensor data may be sensor data captured by a light level sensor and/or a proximity sensor that senses distances of objects from the camera capturing the image (e.g., a time of flight sensor). The system 300 may analyze the light level sensor and/or the proximity sensor data and determine a light level at a time when the multiple images were captured and/or a distance of one or more objects (e.g., persons) within the multiple images based on the analysis.

In some implementations, the system 300 may analyze the camera data (e.g., the multiple images) and determine criteria relevant to the captured images based on the analysis. In these implementations, the system 300 may analyze the camera data to determine a distance of one or more objects (e.g., persons) within the multiple images. The system 300 also may analyze faces detected within the multiple images and determine whether features of the detected faces have characteristics that suggest the face is of a female or a male. In this regard, the system 300 may determine the gender of the detected faces within the multiple images. The system 300 further may perform skin tone processing of faces detected within the multiple images and determine ethnicity of persons within the multiple images based on the skin tone processing.

In some examples, the system 300 may consider a combination of the sensor data and the camera data in determining criteria relevant to the multiple images of the potential suspect. In these examples, the system 300 may determine a distance of one or more objects (e.g., persons) within the multiple images based on sensor data from a proximity sensor and then confirm the measured distances or that the objects are in fact persons based on analysis of the camera data. Based on the sensor data and/or the camera data, the system 300 may determine lighting conditions, distance of persons in the multiple images, camera angle with respect to persons in the multiple images, gender of persons in the multiple images, ethnicity of persons in the multiple images, and any other criteria relevant to the multiple images of the potential suspect that assists in informing processing needed on the multiple images.

The system 300 evaluates distribution of similarity scores in the watch list (1120). For instance, the system 300 analyzes how spread out the similarity scores in the watch list and determines whether the similarity scores are evenly distributed throughout the watch list or clustered in one or more groups based on the analysis. When the similarity scores are evenly distributed throughout the watch list, the reference image is relatively good for the images of the persons in the watch list and the similarity scores allow the system 300 to narrow down to a relatively small number of potential matches by searching the similarity scores. When the similarity scores are clustered in one or more groups, the reference image is relatively poor for the images of the persons in the watch list and the similarity scores may leave the system 300 with a relatively large number of potential matches based on the similarity score of the potential suspect falling within a group of similarity scores.

The system 300 selects a reference image based on the criteria and the evaluation (1130). For example, the system 300 considers the criteria determined (e.g., lighting conditions, distance, camera angle, gender, ethnicity, etc.) and selects a reference image appropriate for the criteria determined. In this example, the system 300 uses multiple reference images and the watch list stores multiple index profiles (e.g., a sorted list of similarity scores for each reference image). Each reference image may be stored with metadata that defines the criteria for which is reference image provides better performance. For instance, when the lighting conditions are relatively poor and the distance of the person is relatively far from the camera, the system 300 selects a first reference image that provides relatively good performance for images of a potential suspect that are captured in relatively poor lighting conditions when the potential suspect is relatively far from the camera. When the lighting conditions are relatively good and the distance of the person is relatively near the camera, the system 300 selects a second reference image that provides relatively good performance for images of a potential suspect that are captured in relatively good lighting conditions when the potential suspect is relatively near the camera. To determine the reference image to use in searching the watch list, the system 300 may reference a look-up table that stores an indication of which one or more reference images provide good performance for the various possible values (or value ranges) for the criteria used by the system 300 to select the reference image. The system 300 may store the look-up table in electronic storage based on user input provided by an operator of the system 300.

In some implementations, the system 300 considers the distribution of similarity scores within the watch list in selecting the reference image. In these implementations, the system 300 may determine that similarity scores in the watch list for a particular reference have become clustered and, based on the determination, change the reference image being used for the watch list. When the system 300 uses multiple reference images and the watch list stores multiple index profiles (e.g., a sorted list of similarity scores for each reference image), the system 300 may select the reference image for which the similarity scores are most evenly distributed throughout the list.

In some examples, the system 300 selects the reference image using a combination of the criteria determined (e.g., lighting conditions, distance, camera angle, gender, ethnicity, etc.) and the distribution of similarity scores within the watch list. In these examples, the system 300 may first narrow down the potential reference images to a subset of reference images that provide relatively good performance for the criteria determined. After narrowing down the potential reference images to the subset of reference images, the system 300 analyzes the distribution of similarity scores within the lists of similarity scores for each of the subset of reference images and selects the reference image that corresponds to the most evenly-distributed list of similarity scores. The system 300 also may first consider the distribution of similarity scores to arrive at the subset of reference images and then select the reference image from the subset of reference images that provides the best performance for the criteria determined.

Figure 12:
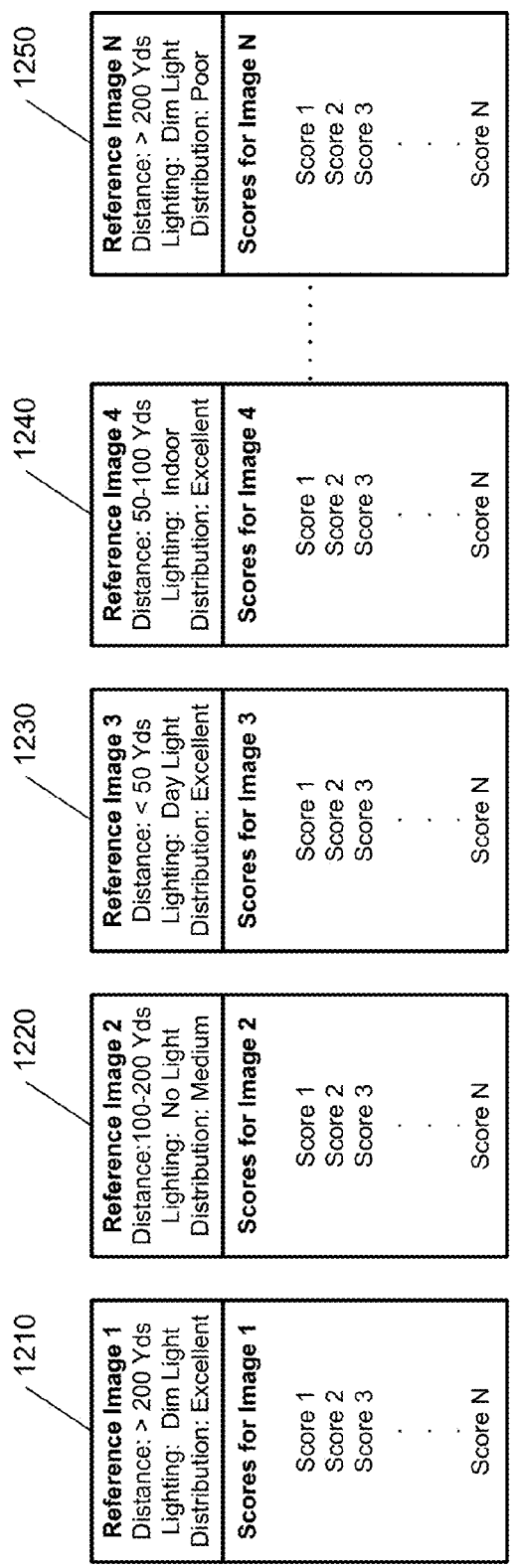
FIG. 12 illustrates exemplary reference images and corresponding index lists.

FIG. 12 illustrates example reference images and corresponding index lists. As shown in FIG. 12, five reference images and corresponding index lists are shown. However, implementations may include more (perhaps many more) or fewer reference images and corresponding index lists. Each of the reference images is stored with metadata that indicates the criteria for which the corresponding reference image provides good performance and also metadata that indicates how the similarity scores in the corresponding index list are distributed. The system 300 accesses the metadata to select which reference image to use (or start with) in processing images of a potential suspect in a particular situation. The system 300 may use a matrix of reference images to provide relatively good searching characteristics for each of the possible situations the system 300 may encounter.

As shown in FIG. 12, a first reference image and a first index list 1210 includes metadata that indicates that the first reference image provides relatively good performance for distances greater than two hundred yards and dim lighting conditions. The first reference image and the first index list 1210 also include metadata that indicates that the distribution of similarity scores within the first index list is excellent. A second reference image and a second index list 1220 include metadata that indicates that the second reference image provides relatively good performance for distances between one hundred and two hundred yards and no light. The second reference image and the second index list 1220 also include metadata that indicates that the distribution of similarity scores within the second index list is of medium quality (e.g., some clustering of similarity scores within the second index list). A third reference image and a third index list 1230 includes metadata that indicates that the third reference image provides relatively good performance for distances less than fifty yards and day light conditions. The third reference image and the third index list 1230 also include metadata that indicates that the distribution of similarity scores within the third index list is excellent. A fourth reference image and a fourth index list 1240 includes metadata that indicates that the fourth reference image provides relatively good performance for distances between fifty and one hundred yards and indoor lighting conditions. The fourth reference image and the fourth index list 1240 also include metadata that indicates that the distribution of similarity scores within the fourth index list is excellent. An nth reference image and an nth index list 1250 includes metadata that indicates that the nth reference image provides relatively good performance for distances greater than two hundred yards and dim lighting conditions. The nth reference image and the nth index list 1250 also include metadata that indicates that the distribution of similarity scores within the nth index list is of poor quality (e.g., significant clustering of similarity scores within the nth index list).

The system 300 uses the metadata associated with the reference images and corresponding index lists shown in FIG. 12 to determine which reference image to use. For example, the system 300 determines that the distance of the potential suspect is greater than two hundred yards from the camera and dim lighting conditions exist. In this example, the system 300 determines that the first reference image and the first index list 1210 and the nth reference image and the nth index list 1250 meet the criteria of greater than two hundred yards from the camera and dim lighting conditions. The system 300 then considers the distribution of the similarity scores within the first index list and the nth index list and selects the first reference image and the first index list 1210 because the distribution in the first index list is excellent and the distribution in the nth index list is poor. In this regard, the system 300 uses the first reference image and the first index list 1210 to perform a search based on the image of the potential suspect and only consults the nth reference image and the nth index list 1250 as a secondary option if the system 300 cannot determine a satisfactory result using the first reference image and the first index list 1210. In some implementations, the system 300 may discard the nth reference image and the nth index list 1250 based on a determination that the distribution of similarity scores in the nth index list is poor.

Referring again to FIG. 10, the system 300 computes a similarity score based on the accessed reference image (1020). For example, the system 300 computes a similarity score that represents similarity between the accessed biometric image and the reference image. In this example, the system 300 may compare the accessed biometric image with the reference image and generate a numeric value that reflects similarity between the accessed biometric image and the reference image. The system 300 may compute the similarity scores between the two templates extracted from the two images. The resulting score reflects the similarity between the accessed biometric image and the reference image in that the score is closer to zero depending how similar the accessed biometric image is to the reference image (i.e., the score would be zero for same images and near to zero for identical images). Any type of process for computing a similarity score (e.g., numeric value) that reflects similarity between two images may be used. For example, to compute a similarity score between two images, a method for matching using zero crossings of a one dimensional Discrete Cosine Transform (DCT) may be used to perform feature extraction for later classification.

In some examples, the system 300 may access multiple biometric images of the person (e.g., multiple face images) and compute, for each of the multiple biometric images, a similarity score that represents similarity between the corresponding biometric image and the reference image. In these examples, the system 300 may determine an average similarity score or median similarity score based on the similarity scores computed for the multiple biometric images. Using multiple biometric images of the person may provide a more accurate similarity score and may account of slight differences in position when capturing biometric images of the person as compared to position in the reference.

In some implementations, the system 300 may use one or more image similarity processes to generate a similarity measure between the accessed biometric image and the reference image. In these implementations, the system 300 may normalize the similarity measure to a similarity score between zero and one. Normalization allows the system 300 to use a similarity process that produces a measure outside of a desired scale. In addition, normalization may allow different similarity processes with different output ranges to be used and may allow for changes in the similarity process as long as the normalization is adjusted to compute similarity scores within the desired range (e.g., zero to one).

The system 300 searches the watch list using the computed similarity score (1030). For instance, the system 300 compares the computed similarity score to the sorted similarity scores in the watch list and identifies one or more matches based on the comparison. The system 300 may identify a closest match to the computed similarity score and/or may identify a group of people having similarity scores within a threshold of the computed similarity score. Searching based on a similarity score may improve the speed of searching biometric data over traditional techniques that search based on a comparison of more detailed data.

In some implementations, the system 300 may search the sorted similarity scores in a manner that leverages knowledge of how the similarity scores included in the watch list are sorted. In these implementations, the system 300 may perform a binary search of the sorted similarity scores using the computed similarity score. For example, the similarity scores included in the biometric data may be sorted in a list in descending order. In this example, the system 300 compares the computed similarity score to a similarity score at a central point in the sorted list. If the comparison reveals that the computed similarity score is more than a threshold greater than the similarity score at the central point in the sorted list, the system 300 discards a bottom half of the sorted list and moves to a similarity score at a central point in the remaining portion (e.g., upper half) of the sorted list. If the comparison reveals that the computed similarity score is more than the threshold less than the similarity score at the central point in the sorted list, the system 300 discards an upper half of the sorted list and moves to a similarity score at a central point in the remaining portion (e.g., bottom half) of the sorted list. The system 300 continues to search the sorted list in half intervals until one or more matches that are within the threshold of the computed similarity score are located. Because the system 300 knows that the similarity scores are sorted in a list in descending order, the system 300 is able to discard relatively large portions of the sorted list with a single comparison and without the need to compare the computed similarity score to all of the similarity scores included in the biometric data. Any type of search process that leverages knowledge of how data is sorted may be used by the system 300 to search the sorted similarity scores. For example, a binary search method can be used that is based on the linear ordering of keys, such as alphabetic order or numeric order. In some examples, the numeric order may be used when searching a list of similarity scores which are numbers. In this example, a given input argument K (e.g., a similarity score) is compared to a middle key Kx in the sorted list and the result of this comparison tells which half of the table should be searched next. The result can be one of the three possible scenarios—K<Kx, K=Kx or K>Kx. In case K=Kx, a match is identified. If K<Kx, all of the elements in the table with keys greater than Kx are discarded. Similarly, if K>Kx, all of the elements in the table with keys less than Kx are discarded. Thus, in each iteration of the search, half of the table is eliminated and hence the search is completed in log N time. A more detailed explanation of the binary search process is given in 'The Art of Computer Programming', Volume 3: Sorting and Searching, Third Edition. Addison-Wesley, 1997. ISBN 0-201-89685-0. Section 6.2.1: Searching an Ordered Table, pp. 409-426 by 'Donald Knuth'.

The system 300 identifies a subset of persons in the watch list having a similarity score within a threshold (1040). For example, the system 300 identifies a subset of persons that are each associated with a similarity score within a threshold of the computed similarity score based on the searching. The system 300 may identify the subset of people by identifying similarity scores whose absolute difference from the computed similarity score is less than or equal to the threshold. If the similarity scores were not sorted, the system 300 would have to compare the computed similarity score against all of the similarity scores to ensure each appropriate person is found. However, because the similarity scores are sorted, the system 300 may find the subset of persons more quickly by discarding multiple similarity scores using a single comparison and knowledge of how the similarity scores are sorted.

Figure 13:
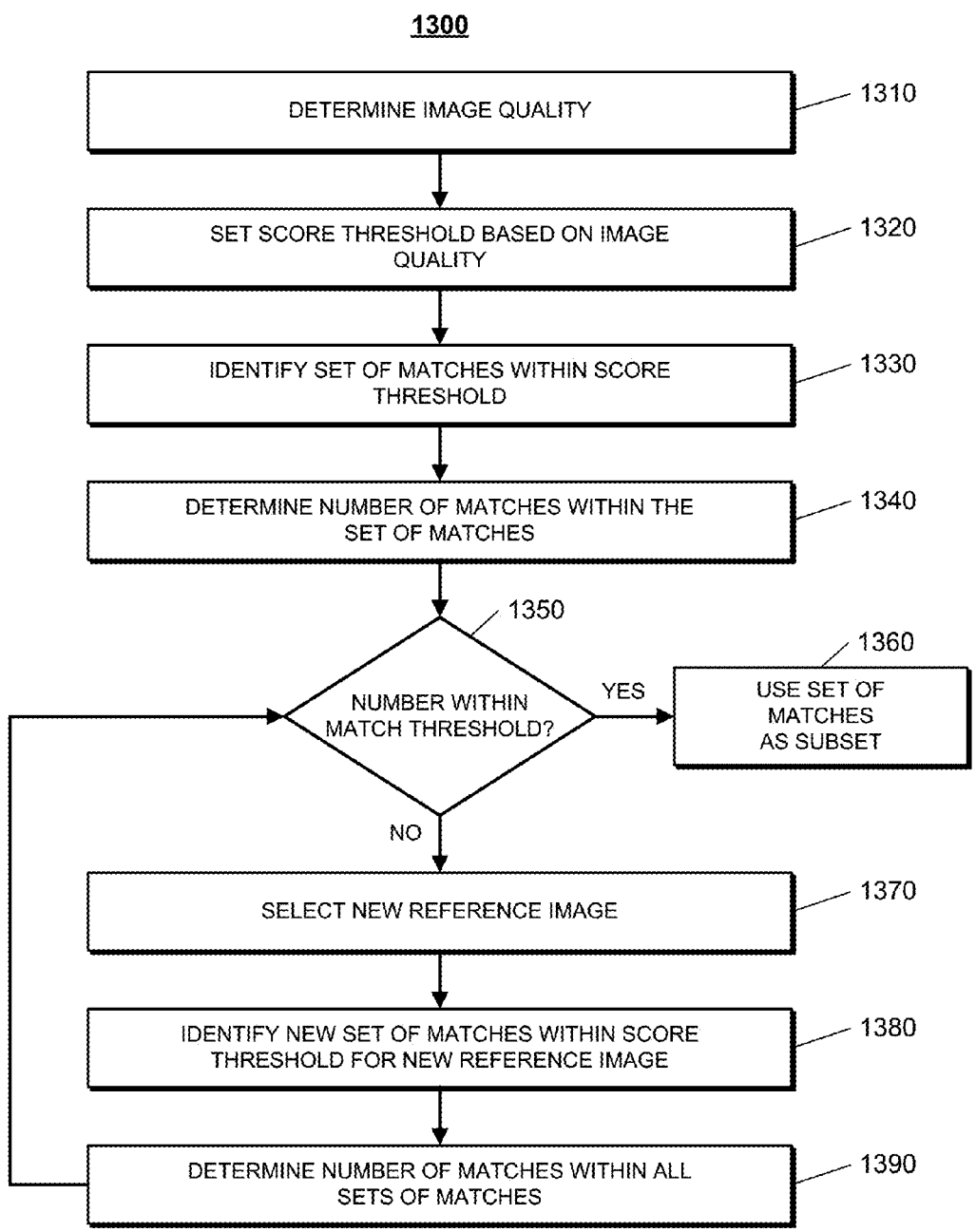

FIG. 13 illustrates a process 1300 for identifying a subset of persons in the watch list. The process 1300 may be used in identifying a subset of persons in the watch list having a similarity score within a threshold referenced above with respect to reference numeral 1040. The operations of the process 1300 are described generally as being performed by the system 300. In some implementations, operations of the process 1300 may be performed by one or more processors included in one or more electronic devices.

The system 300 determines image quality (1310). For instance, the system 300 determines a quality of the image of the potential suspect. The quality may be determined as a number of pixels, a level of clarity (or lack of blurriness), or any other measure of quality of captured images. The system 300 also may determine a quality of images of persons included in the watch list. The system 300 further may determine a quality of the reference image used to compute a similarity score for the image of the potential suspect and similarity scores for the images of persons included in the watch list.

The system 300 sets a score threshold based on the image quality (1320). For example, the system 300 sets a score threshold used in determining a subset of matches in searching the similarity scores in the watch list based on a level of the determined quality of the images. In this example, the system 300 sets a relatively low threshold based on a determination that the image quality is relatively good and the system 300 sets a relatively high threshold based on a determination that the image quality is relatively poor. A low threshold is used when the image quality is good because the matching process is more accurate with high quality images. A high threshold is used when the image quality is poor because the matching process is less accurate with low quality images.

The system 300 identifies a set of matches within the score threshold (1330). For example, the system 300 uses a reference image to compute a similarity score for the image of the potential suspect and uses the computed similarity score to search the sorted list of similarity scores in the watch list in a manner that leverages knowledge of how the similarity scores are sorted (e.g., ascending or descending order). Based on results of the searching, the system 300 identifies a subset of persons in the watch list that are each associated with a similarity score within the score threshold of the computed similarity score. The system 300 may identify the subset of persons by identifying similarity scores whose absolute difference from the computed similarity score is less than or equal to the score threshold. If the similarity scores were not sorted, the system 300 would have to compare the computed similarity score against all of the similarity scores to ensure each appropriate person is found. However, because the similarity scores are sorted, the system 300 may find the subset of people more quickly by discarding multiple similarity scores using a single comparison and knowledge of how the similarity scores are sorted.

The system 300 determines a number of matches within the set of matches (1340). For instance, the system 300 counts the number of matches included in the set of matches that have similarity scores within the score threshold of the similarity score of the potential suspect.

The system 300 determines whether the number of matches within the set of matches is within a match threshold (1350). For instance, the system 300 accesses the match threshold, compares the determined number of matches within the set of matches to the match threshold, and determines whether the determined number of matches within the set of matches is less than the match threshold based on the comparison. The match threshold may be a pre-set value (e.g., one hundred matches) or may be dynamically determined based on the current context and/or criticality of the situation.

Based on a determination that the number of matches within the set of matches is within the match threshold, the system 300 uses the set of matches as the subset (1360). For example, based on the system 300 determining that the number of matches within the set of matches is less than the match threshold, the system 300 determines that additional narrowing of the set of matches is unnecessary and the system 300 begins detailed comparison and processing of the images of the persons included in the set of matches.

Based on a determination that the number of matches within the set of matches is not within the match threshold, the system 300 selects a new reference image (1370). For instance, based on the system 300 determining that the number of matches within the set of matches is more than the match threshold, the system 300 determines that additional narrowing of the set of matches is needed to avoid excess costs. To perform the additional narrowing of the set of matches, the system 300 selects a new reference image to use in narrowing the set of matches. The new reference image is different than the reference image used to arrive at the set of matches. The system 300 may select a new reference image using the techniques described above with respect to reference numeral 1010 and FIG. 11.

The system 300 identifies a new set of matches within the score threshold for the new reference image (1380). For example, the system 300 uses the new reference image to compute a similarity score for the image of the potential suspect and uses the computed similarity score to search the sorted list of similarity scores in the watch list associated with the new reference image in a manner that leverages knowledge of how the similarity scores are sorted (e.g., ascending or descending order). Based on results of the searching, the system 300 identifies a subset of persons in the watch list that are each associated with a similarity score within the score threshold of the similarity score computed using the new reference image. The system 300 may identify the subset of persons by identifying similarity scores whose absolute difference from the similarity score computed using the new reference image is less than or equal to the score threshold.

The system 300 determines the number of matches within all sets of matches (1390). For example, the system 300 compares the matches included in the new set of matches with the matches included in the original set of matches and identifies a common set of matches included in each of the new set of matches and the original set of matches. In this example, the system 300 counts the number of matches included in the common set of matches, which includes all of the matches found in both the new set of matches and the original set of matches. The common set of matches becomes the set of matches under consideration for further processing.

After determining the number of matches within all sets of matches, the system 300 determines whether the number of matches within all sets of matches is within the match threshold (1350). Based on a determination that the number of matches within all sets of matches is within the match threshold, the system 300 uses the matches within all sets of matches as the subset (1360). Based on a determination that the number of matches within all sets of matches is not within the match threshold, the system 300 repeats operations 1350 to 1390 until the number of matches within all sets of matches is within the match threshold. To the extent that the system 300 uses all reference images and the match threshold has not been reached, the system 300 ends processing and uses the matches within all sets of matches as the subset, despite the number of matches within all sets of matches falling outside of the threshold.

Referring again to FIG. 4, the system 300 controls parallel analysis of the determined image against detailed biometric data for the subset (470) and determines whether the potential suspect matches a person in the watch list based on the analysis (480). For example, the system 300 identifies detailed biometric data linked to each of the persons in the subset and accesses the detailed biometric data identified. In this example, the system 300 may access, from an index table stored in relational database storage, a link to detailed biometric data (e.g., blob data of a facial image) for each person in the subset and use the accessed link to retrieve detailed biometric data for each person in the subset. The system 300 further may access detailed biometric data for one or more persons in the subset directly from the index table stored in relational database storage. The system 300 may access each instance of the detailed biometric data for the subset (e.g., each blob) in parallel because each instance of the detailed biometric data for the subset (e.g., each blob) is stored on a separate partition server in the cloud.

In some implementations, the system 300 compares the detailed biometric data for the persons in the subset to detailed biometric data for the accessed biometric image of the potential suspect. The system 300 may use any type of technique to compare the detailed biometric data for the person to the detailed biometric data for each person in the subset. For instance, the system 300 may use any image matching process for face images to compare the detailed biometric data for the potential suspect to the detailed biometric data for each person in the subset. The system 300 may compare each instance of the detailed biometric data for the subset (e.g., each blob) with the detailed biometric data for the potential suspect in parallel. Each comparison may be performed by a different processor in the cloud in parallel.

The system 300 determines whether the potential suspect matches a person in the watch list based on the analysis. For example, the system 300 analyzes results of the detailed comparison and determines which person in the subset is the closest match. In this example, the system 300 may determine whether the closest match meets a threshold level of confidence in the match and outputs the closest match based on a determination that the closest match meets the threshold level of confidence. Based on a determination that the closest match does not meet the threshold level of confidence, the system 300 may provide output that no match exists.

Figure 14:
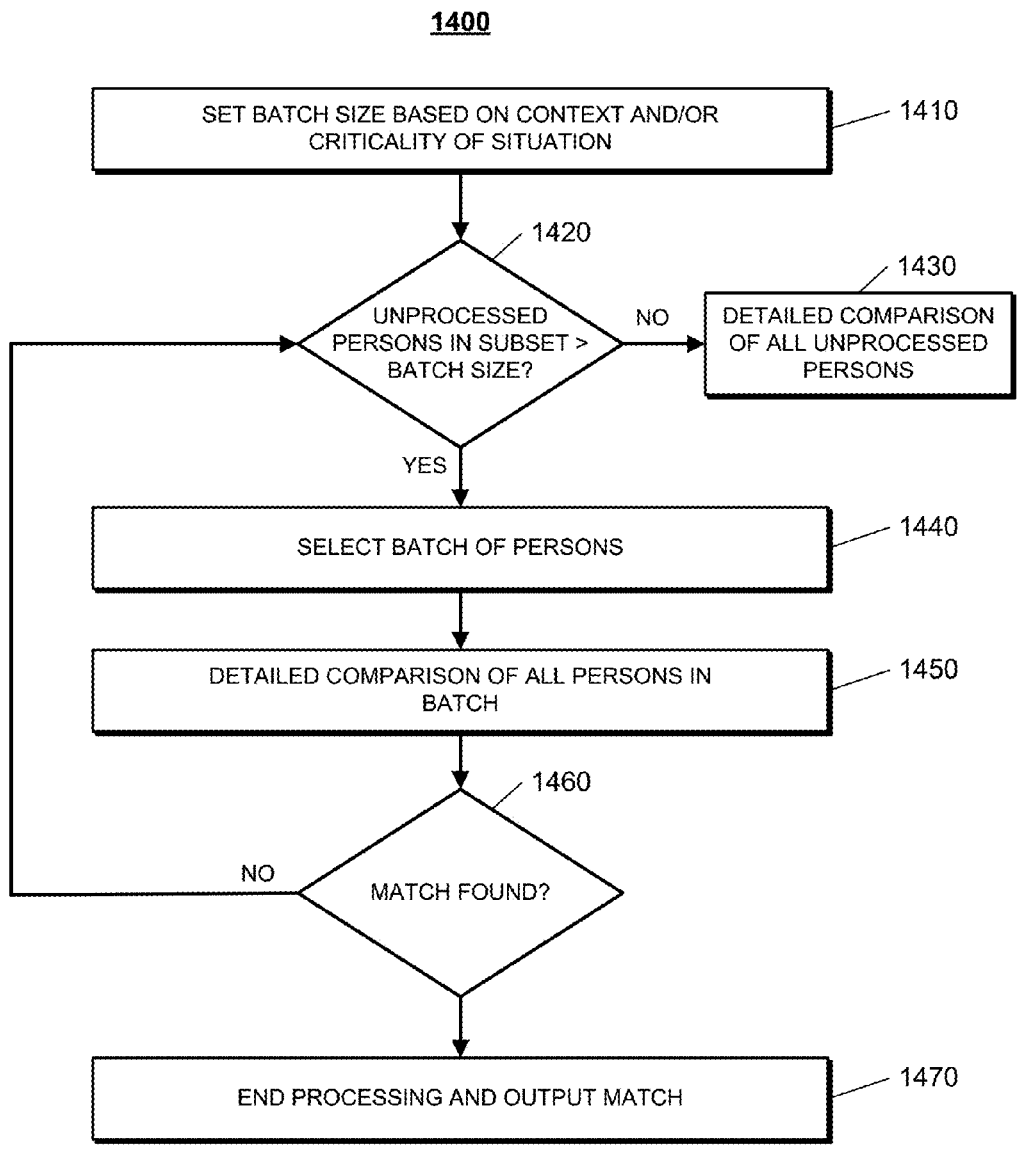

FIG. 14 illustrates a process 1400 for performing detailed analysis of biometric data for a potential suspect against persons in a watch list. The process 1400 may be used in controlling parallel analysis of the determined image against detailed biometric data for the subset and determining whether the potential suspect matches a person in the watch list referenced above with respect to reference numerals 470 and 480. The operations of the process 1400 are described generally as being performed by the system 300. In some implementations, operations of the process 1400 may be performed by one or more processors included in one or more electronic devices.

The system 300 sets a batch size based on context and/or criticality of the situation (1410). For example, the system 300 determines the context and criticality of the situation based on user input, a pre-defined setting, and/or an alert feed. In this example, the system 300 may receive user input that defines a baseline context and criticality of a particular area or location and the system 300 sets the batch size based on the baseline context and criticality of the particular area or location. If the context and/or criticality changes temporarily (e.g., a threat is made or a person of interest is reported to be in the particular area or location), the system 300 receives updated user input to reflect the change and sets the batch size based on the updated context and/or criticality. The system 300 also may update the context and/or criticality based on an alert feed. For instance, the system 300 may receive a threat level alert provided by a government organization or other organization and update the context and/or criticality as appropriate for the threat level provided by the government organization or other organization.

The system 300 considers the context and/or criticality and sets the batch size based on the context and/or criticality. The system 300 sets the batch size as appropriate for the context and/or criticality. For instance, when the context is a high crime area and the criticality of the situation is relatively high, the system 300 sets a relatively large batch size because the circumstances justify the expense of processing more images in parallel. When the context is a low crime area and the criticality of the situation is relatively low, the system 300 sets a relatively small batch size because the circumstances do not justify the expense of processing more images in parallel. To determine the batch size, the system 300 may reference a look-up table that stores batch sizes to use for the various possible values (or value ranges) for the context and/or criticality used by the system 300 to set the batch size. The system 300 may store the look-up table in electronic storage based on user input provided by an operator of the system 300.

FIG. 15 illustrates example data structure 1500 used in setting a batch size. As shown in FIG. 15, a data structure 1500 defines a number of images to include in a batch based on the context and the criticality of the situation. The system

300 may use the data structure 1500 to set the batch size based on the context alone, the criticality alone, or a combination of the context and the criticality.

The system 300 references the data structure 1500 in setting the batch size. For example, the system 300 determines the context and criticality of the situation based on user input, a pre-defined setting, and/or an alert feed (e.g., a threat level alert provided by a government organization or other organization). In this example, the system 300 determines whether the criticality of the situation is very high, high, medium, or low. The system 300 also determines whether the context of the situation is in a crime-sensitive area or jewelry store, whether the context of the situation is in an airport or railway station, whether the context of the situation is in a public transport location, a public park, or vehicular surveillance, or whether the context of the situation is in home security or school campus security. Based on the determinations, the system 300 references the data structure 1500 and sets the batch size as the number of images defined by the data structure 1500. For instance, the system 300 selects fifty images based on determining that the criticality is very high and the context is in a crime-sensitive area or jewelry store, selects twenty images based on determining that the criticality is high and the context is in an airport or railway station, selects ten images based on determining that the criticality is medium and the context is in a public transport location, a public park, or vehicular surveillance, and selects five images based on determining that the criticality is low and the context is in home security or school campus security.

Referring again to FIG. 14, the system 300 determines whether the number of unprocessed persons in the subset is greater than the batch size (1420). For instance, the system 300 determines a number of unprocessed persons in the subset and compares the number to the batch size. Based on comparison results, the system 300 determines whether the number of unprocessed persons in the subset is greater than the batch size.

Based on a determination that the number of unprocessed persons in the subset is less than or equal to the batch size, the system 300 performs a detailed comparison of all remaining unprocessed persons (1430). Because the number of unprocessed persons in the subset is less than or equal to the batch size, the system 300 performs, in parallel, detailed biometric comparison of the image (e.g., blob data) of the potential suspect against each of the images (e.g., blob data) of the persons in the subset identified from the watch list. The parallel comparison and analysis of the image (e.g., blob data) of the potential suspect against each of the images (e.g., blob data) of the persons in the subset identified from the watch list is possible because the images (e.g., blob data) of the persons in the subset identified from the watch list are stored in a cloud storage system with each image (e.g., instance of blob data) being stored on a different partition server.

Figure 16:
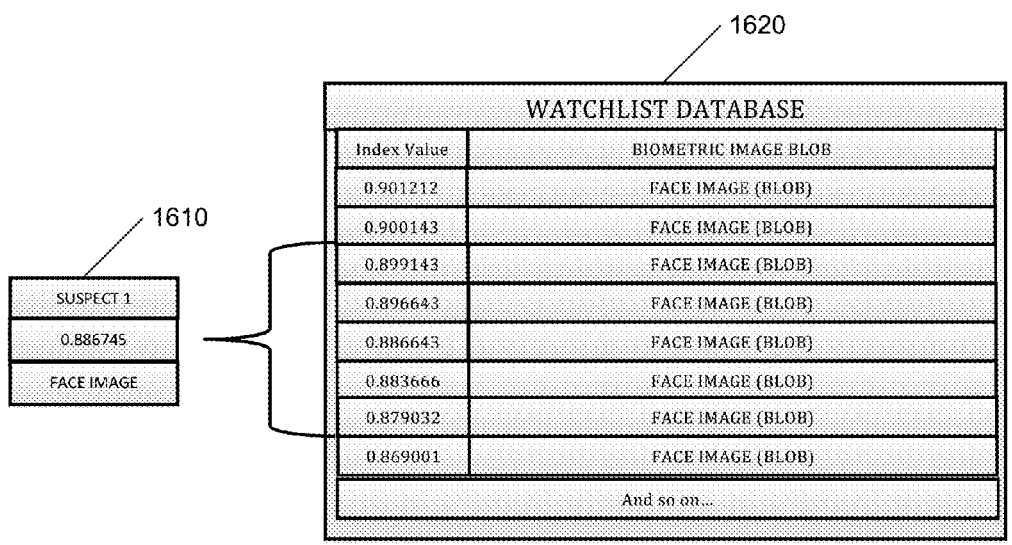
FIGS. 16 and 17 illustrate exemplary batches of persons from a watch list.

FIG. 16 illustrates an example in which the subset is less than or equal to the batch size. As shown in FIG. 16, the system 300 computes a similarity score for a potential suspect 1610 as 0.886745. Using a threshold of 0.013, the system 300 compares the similarity score for the potential suspect 1610 to a watch list database 1620 that includes sorted similarity scores for persons in the watch list. Based on the comparison, the system 300 identifies all persons in the watch list database 1620 that have a similarity score that is within 0.013 (above or below) of the similarity score for the potential suspect 1610. As shown, the system 300 determines that only five persons in the watch list are within the threshold. Because the system 300 determines that the batch size is five or greater, the system 300 processes the detailed facial image (e.g., blob data) of each of the five persons in parallel.

Referring again to FIG. 14, the system 300 selects a batch of persons based on a determination that the number of unprocessed persons in the subset is greater than the batch size (1440). For instance, because the number of unprocessed persons in the subset from the watch list exceeds the batch size, the system 300 selects less than all of the unprocessed persons in the subset for processing first. The system 300 may select the unprocessed persons in the subset from the watch list that have the closest similarity scores to the potential suspect for the batch because the persons with the closest similarity scores are more likely to result in a match than other persons in the subset. The system 300 may consider whether any of the persons in the unprocessed persons in the subset from the watch list are more likely results than others. For instance, the system 300 may select any of the unprocessed persons in the subset from the watch list have been reported to be an area where the multiple images were captured or are known to be geographically proximate to the area where the multiple images were captured. The system 300 may select those persons for the batch because they may be more likely to result in a match than other persons that are thought to be in other geographic locations, even though the other persons have closer similarity scores to the potential suspect than the persons selected.

The system 300 performs a detailed comparison of all persons in the selected batch (1450). For example, the system 300 identifies detailed biometric data linked to each of the similarity scores for the persons in the selected batch and accesses the detailed biometric data identified. In this example, the system 300 may access a user identification number for each person in the selected batch and use the accessed user identification numbers to retrieve detailed biometric data for each person in the selected batch. The system 300 also may access, from an index table stored in relational database storage, a link to detailed biometric data (e.g., blob data of a facial image) for each person in the selected batch and use the accessed link to retrieve detailed biometric data for each person in the selected batch. The system 300 further may access detailed biometric data for one or more persons in the selected batch from an index table stored in relational database storage. The detailed biometric data for each person in the selected batch may include data that is more descriptive of the biometric image of the face of the corresponding person than the similarity score for the corresponding person. The detailed biometric data for the persons in the selected batch also may have a greater storage size than the similarity score for the corresponding person. The detailed biometric data may include the biometric images that were used to compute the similarity scores for the subset of the people or another representation (e.g., blob data) for the biometric images.

In some implementations, the system 300 compares the detailed biometric data for the persons in the selected batch to detailed biometric data for the accessed biometric image of the potential suspect. For instance, the system 300 may access detailed biometric data for the potential suspect and compare the detailed biometric data for the potential suspect to the detailed biometric data for each person in the selected batch. The detailed biometric data for the person is the same type of biometric data as the detailed biometric data for the subset of the people and may be more descriptive of the biometric image of the person than the computed similarity score. The detailed biometric data for the person also may have a greater storage size than the computed similarity score. The detailed biometric data for the person may include the biometric image that was used to compute the similarity scores for the person or another representation (e.g., template/blob data) for the biometric image.

The system 300 may use any type of technique to compare the detailed biometric data for the person to the detailed biometric data for each person in the subset of the people. For instance, the system 300 may use any image matching process for that particular modality/sub-modality, to compare the detailed biometric data for the person to the detailed biometric data for each person in the subset of the people. The process can be similar to the one discussed above as an example for left-iris matching technique based on weighted Hamming Distance metric as described in 'DCT-based iris recognition', by D. M. Monro, S. Rakshit and D. Zhang, published in IEEE Transactions on Pattern Analysis and Machine Intelligence, Vol. 29, No. 4, pp. 586-595, April 2007. Because the detailed biometric data is more descriptive than the similarity scores, the comparison of the detailed biometric data may be more time consuming and more accurate than the comparison involving the similarity scores. However, the comparison involving the similarity scores may still be useful because it narrows down the potential matches to a subset of the people prior to the more detailed and time consuming process being performed. This staged approach may speed up the search process and still provide the accuracy of traditional biometric systems that perform more detailed analysis on all possible matches from the outset.

The system 300 determines whether a match is found within the selected batch based on the detailed comparison of all persons in the selected batch (1460). For example, the system 300 analyzes results of the detailed comparison and determines which person in the selected batch is the closest match. In this example, the system 300 may determine whether the closest match meets a threshold level of confidence in the match and outputs the closest match based on a determination that the closest match meets the threshold level of confidence. Based on a determination that the closest match does not meet the threshold level of confidence, the system 300 may provide output that no match exists within the selected batch or may provide output identifying multiple potential matches with an indication that none of the potential matches meets the threshold level of confidence.

Based on a determination that a match is found within the selected batch, the system 300 ends processing and outputs the match (1470). Although additional batches remain unprocessed, the system 300 ends processing because a match was found and it is unnecessary to complete processing for the remaining persons in the subset of persons identified from the watch list. Based on a determination that a match is not found within the selected batch, the system 300 moves on to process another batch of images in parallel until all of the subset of persons identified from the watch list have been processed or a match is found. Specifically, the system 300 repeats operations 1420 to 1470 until all of the subset of persons identified from the watch list have been processed or a match is found.

Figure 17:
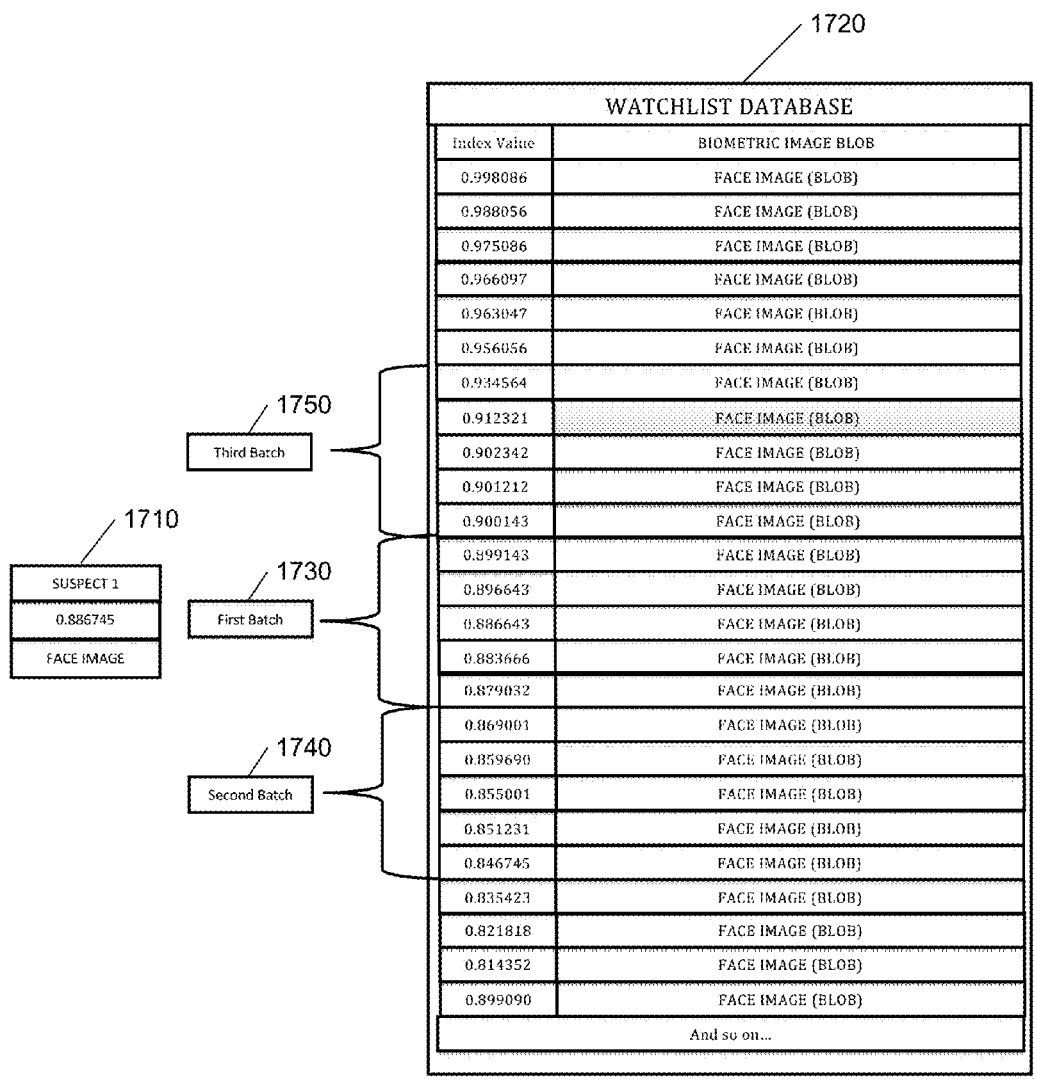

FIG. 17 illustrates an example in which the subset is greater than the batch size and multiple batches of images are processed. As shown in FIG. 17, the system 300 computes a similarity score for a potential suspect 1710 as 0.886745. Using a threshold of 0.05, the system 300 compares the similarity score for the potential suspect 1710 to a watch list database 1720 that includes sorted similarity scores for persons in the watch list. Based on the comparison, the system 300 identifies all persons in the watch list database 1720 that have a similarity score that is within 0.005 (above or below) of the similarity score for the potential suspect 1710.

As shown, the system 300 determines that fifteen persons in the watch list are within the threshold. Because the system 300 determines that the batch size is five, the system 300 determines to select three batches of images for processing. As shown, the system 300 selects a first batch of images 1730 to process, a second batch of images 1740 to process, and a third batch of images 1750 to process. The system 300 selects the first batch of images 1730 as the five images having the closest similarity score to the similarity score for the potential suspect 1710. The system 300 selects the second batch of images 1740 as the five images having similarity scores below the first batch of images 1730 and selects the third batch of images 1750 as the five images having similarity scores above the first batch of images 1730. The system 300 may identify the closest match and select batches of images radiating outward from the closest match. Also, the system 300 may identify batches as the images within the batch size having the closest similarity score to the similarity score for the potential suspect 1710. In this regard, the second batch of images may include images with similarity scores above and below the similarity scores within the first batch of images.

After selecting the three batches of images, the system 300 first processes the first batch of images 1730 in parallel. If a match is not found in the first batch of images 1730, the system 300 processes the second batch of images 1740 in parallel. If a match is not found in the second batch of images 1740, the system 300 the system 300 processes the third batch of images 1750 in parallel.

Referring again to FIG. 4, the system 300 outputs a result based on the determination of whether the potential suspect matches a person in the watch list (490). For instance, the system 300 displays a result of the search (e.g., one or more matches identified through searching), stores the result of the search in electronic storage, sends the result of the search in an electronic communication (e.g., an electronic mail message), prints a copy of the result of the search using a printing device, sends the result of the search to another process for additional processing, or performs any other output operation that allows a user to perceive the result of the search and/or that allows the result of the search to be used in further authentication processing. Based on a determination that the potential suspect does not match a person in the watch list, the system 300 outputs an indication that no match was found for the potential suspect. The system 300 may display a result that indicates no match was found for the potential suspect, stores an indication that no match was found for the potential suspect in electronic storage, sends an indication that no match was found for the potential suspect in an electronic communication (e.g., an electronic mail message), prints a copy of the indication that no match was found for the potential suspect using a printing device, sends the indication that no match was found for the potential suspect to another process for additional processing, or performs any other output operation that allows a user to perceive the result that no match was found for the potential suspect and/or that allows the result that no match was found for the potential suspect to be used in further authentication processing.

FIGS. 18-21 illustrate example processing of multiple potential suspects in parallel. As shown in FIGS. 18-21, in addition to performing pre-processing in parallel and performing detailed matching in parallel, the system 300 may process multiple potential suspects in parallel. The techniques described throughout this disclosure regarding matching a single potential suspect may be employed for multiple potential suspects in parallel.

Figure 18:
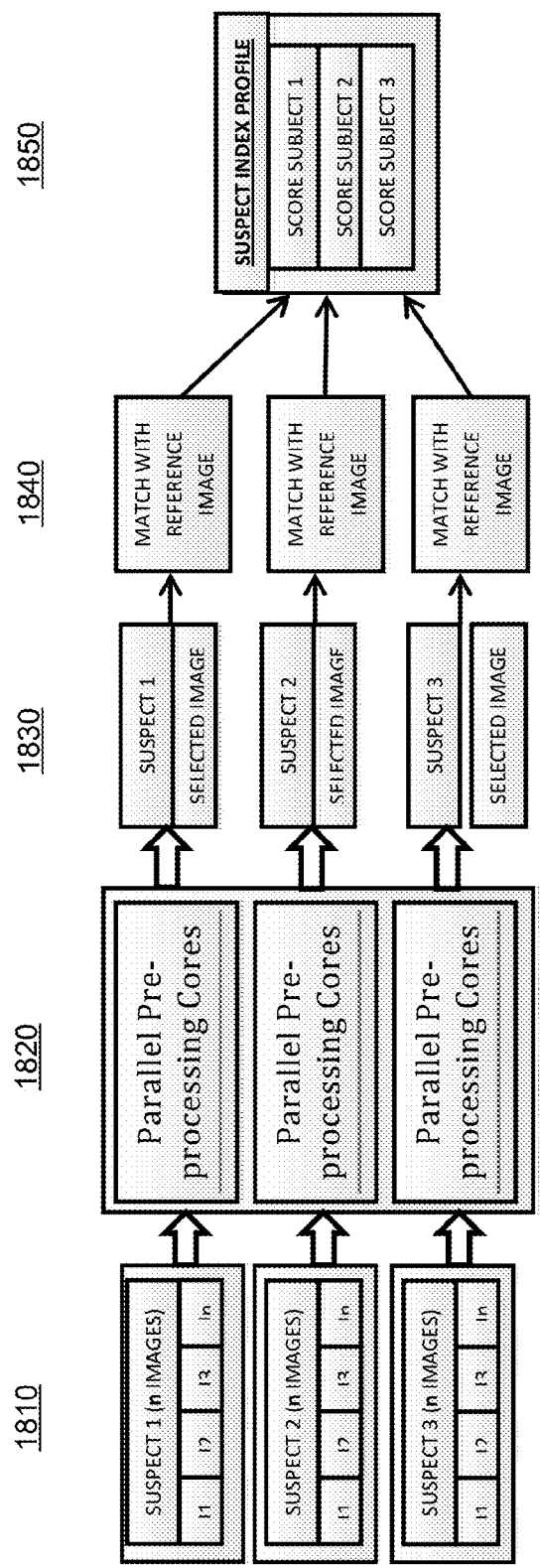
FIGS. 18-21 illustrate exemplary processing of multiple potential suspects in parallel.

For example, as shown in FIG. 18, the system 300 selects potential suspects to process in parallel 1810. In this example, the system 300 selects three suspects to process in parallel. However, in other implementations, the system 300 may process more or fewer potential suspects in parallel.

In some implementations, the system 300 dynamically determines a number of potential suspects to process in parallel. In these implementations, the system 300 may set the number of potential suspects to process in parallel based on context and/or criticality of the situation. The system 300 may use similar techniques to those discussed above with respect to setting the batch size (reference numeral 1410) in setting the number of potential suspects to process in parallel. For instance, as shown in FIG. 15, the data structure 1500 defines a number of potential suspects to process in parallel based on the context and the criticality of the situation. The system 300 may use the data structure 1500 to set the number of potential suspects to process in parallel based on the context alone, the criticality alone, or a combination of the context and the criticality.

The system 300 references the data structure 1500 in setting the number of potential suspects to process in parallel. For example, the system 300 determines the context and criticality of the situation based on user input, a pre-defined setting, and/or an alert feed (e.g., a threat level alert provided by a government organization or other organization). In this example, the system 300 determines whether the criticality of the situation is very high, high, medium, or low. The system 300 also determines whether the context of the situation is in a crime-sensitive area or jewelry store, whether the context of the situation is in an airport or railway station, whether the context of the situation is in a public transport location, a public park, or vehicular surveillance, or whether the context of the situation is in home security or school campus security. Based on the determinations, the system 300 references the data structure 1500 and sets the number of potential suspects to process in parallel defined by the data structure 1500. For instance, the system 300 selects fifty potential suspects based on determining that the criticality is very high and the context is in a crime-sensitive area or jewelry store, selects twenty potential suspects based on determining that the criticality is high and the context is in an airport or railway station, selects ten potential suspects based on determining that the criticality is medium and the context is in a public transport location, a public park, or vehicular surveillance, and selects five potential suspects based on determining that the criticality is low and the context.

After determining the number of potential suspects to process in parallel, the system 300 selects which potential suspects to process in parallel first. For example, the system 300 captures images of large crowds with many potential suspects. In this example, the system 300 only processes a subset of the potential suspects in the crowd, even though the system 300 processes multiple potential suspects in parallel.

To determine the subset of potential suspects to process first, the system 300 considers one or more of several factors. For instance, the system 300 may consider the quality of the images of the faces of the potential suspects in selecting the subset of potential suspects to process first. In this regard, the system 300 may select potential suspects where the image of the face is of relatively high quality (e.g., faces where a clear front view is present in the images). The system 300 may process a first potential suspect where the image of the face of the first potential suspect is a front view prior to processing a second potential suspect where the image of the face of the second potential suspect is a side view.

In addition to the view of the face, the system 300 also may consider the quality of the image of the face in selecting the subset of potential suspects to process first. For example, portions of an image of a crowd may have better lighting than other portions of the image of the crowd. In this example, the system 300 may select potential suspects located in the portions of the image of the crowd that have better lighting prior to potential suspects located in the other portions of the image of the crowd with inferior lighting characteristics.

The system 300 further may consider other image quality characteristics in selecting the subset of potential suspects to process first. For instance, some potential suspects in the image of the crowd may be moving and other potential suspects in the image of the crowd may be stationary. The system 300 may determine that the faces of the persons in the image of the crowd that are moving are blurrier than the faces of the persons in the image of the crowd that are stationary. Based on that determination, the system 300 may select the potential suspects that are stationary (and less blurry) prior to the potential suspects that are moving (and blurrier).

In some implementations, the system 300 may be attempting to identify a particular person on the watch list based on other information that indicates the particular person may be within the area monitored by the system 300. In these implementations, the system 300 may consider similarity of the faces in the image of the crowd to the image of the particular person in selecting the subset of potential suspects to process first. For example, the particular person on the watch list may have known gender and ethnicity characteristics. In this example, the system 300 may scan the faces in the image of the crowd to locate potential suspects in the crowd that have the same gender and ethnicity characteristics as the particular person on the watch list and select the potential suspects that have the same gender and ethnicity characteristics for initial processing. The system 300 also may compute similarity scores for faces in the image of the crowd and select the potential suspects that have similarity scores that are closest to the similarity score of the particular person on the watch list.

After selecting the potential suspects to process in parallel, the system 300 accesses multiple images of each suspect and invokes parallel pre-processing cores for each suspect 1820. The system 300 controls the parallel pre-processing cores to pre-process the multiple images of each suspect in parallel. The system 300 may control pre-processing for each suspect in parallel using the techniques described above with respect to reference numeral 430 and FIG. 8.

Based on results of pre-processing, the system 300 determines a selected image for each suspect 1830. The system 300 may arrive at the selected image for each suspect 1830 at the same time or may arrive at the selected image for each suspect 1830 at staggered times based on how long pre-processing takes for each suspect. The system 300 determines the selected image for each suspect 1830 as the best image from the multiple images of the corresponding suspect or as an aggregate of information from the multiple images of the corresponding suspect that provides the best representation of the corresponding suspect.

After determining the selected image for each suspect 1830, the system 300 matches each of the selected images with a reference image 1840 and generates a suspect index profile 1850 that includes a similarity score for each of the potential suspects being processed in parallel. The system 300 may match each of the selected images with the reference image 1840 in parallel or at staggered times based on when the selected image of each potential suspect is determined. The system 300 may use the techniques described above with respect to reference numerals 1010, 1020, and FIG. 11 to generate the suspect index profile 1850.

Figure 19:
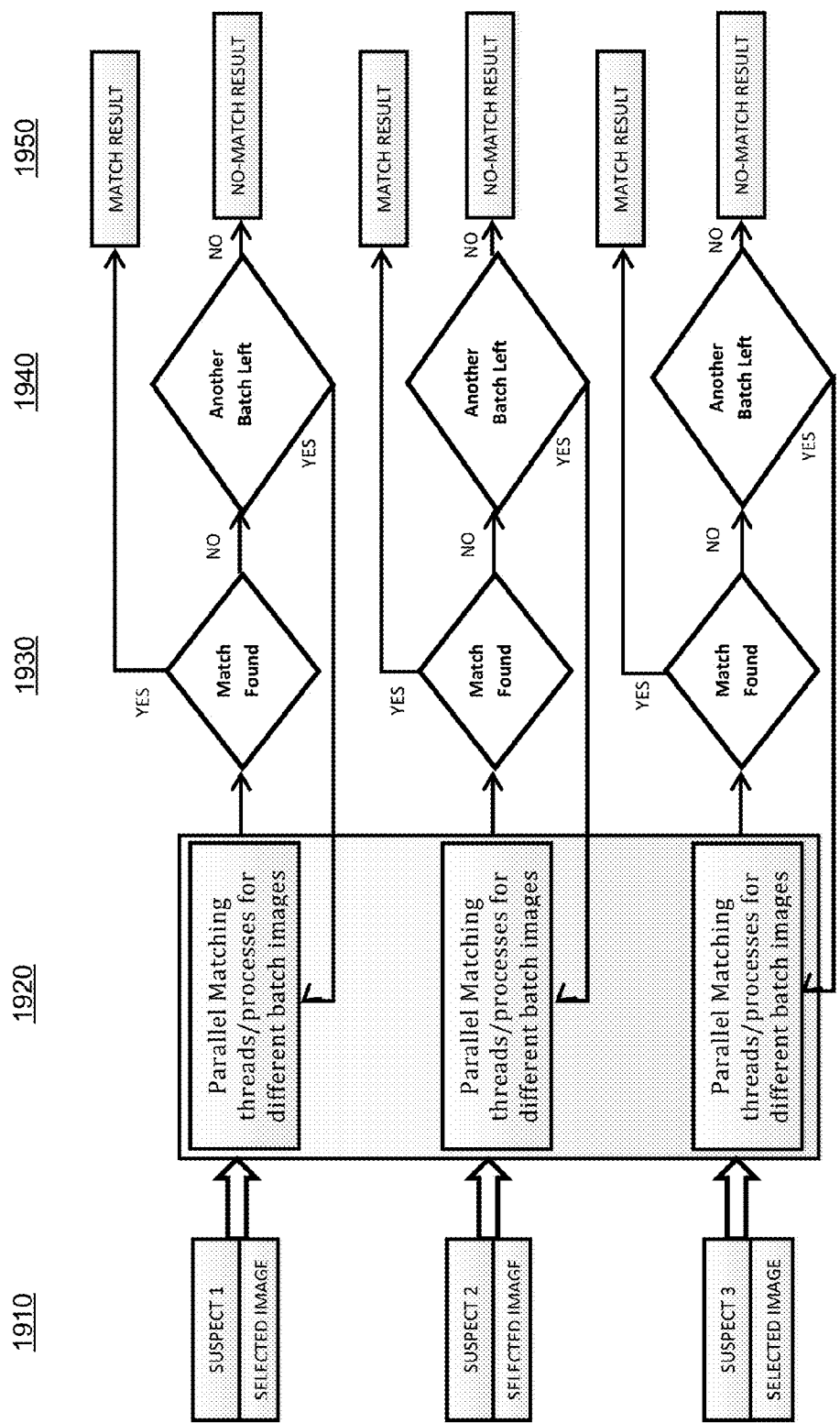

After generating the suspect index profile 1850, as shown in FIG. 19, the system 300 accesses the selected image for each suspect 1910 and invokes parallel matching threads or processes for performing detailed comparison of the selected image for each suspect with different batches of images of persons from the watch list 1920. The system 300 may determine the different batches of images of persons from the watch list to use in the detailed comparison 1920 by using the similarity scores in the suspect index profile 1850 to search the similarity scores in the watch list. The system 300 may search the watch list in parallel for each potential suspect using the techniques described above with respect to reference numerals 1030, 1040, and FIG. 13.

Figure 20:
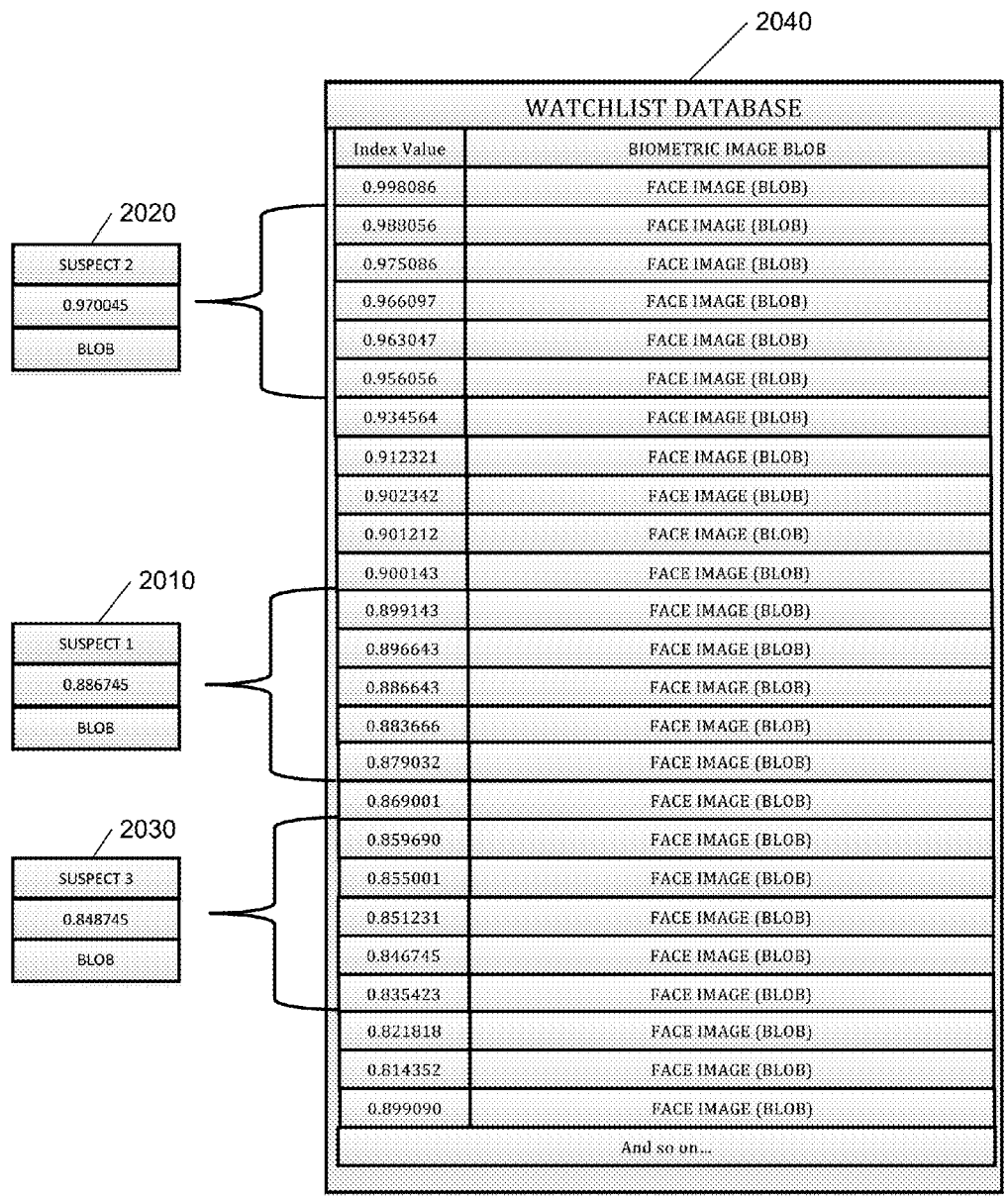

For example, as shown in FIG. 20, the system 300 computes a similarity score for a first potential suspect 2010 as 0.886745, a similarity score for a second potential suspect 2020 as 0.970045, and a similarity score for a third potential suspect 2030 as 0.848745. The system 300 compares, in parallel, the similarity score for each of the first potential suspect 2010, the second potential suspect 2020, and the third potential suspect 2030 to a watch list database 2040 that includes sorted similarity scores for persons in the watch list. Based on the comparison, the system 300 identifies all persons in the watch list database 2040 that have a similarity score that is within a threshold (above or below) of the similarity score for each of the first potential suspect 2010, the second potential suspect 2020, and the third potential suspect 2030. As shown, the system 300 determines a separate batch of five persons in the watch list for each of the first potential suspect 2010, the second potential suspect 2020, and the third potential suspect 2030.

Figure 21:
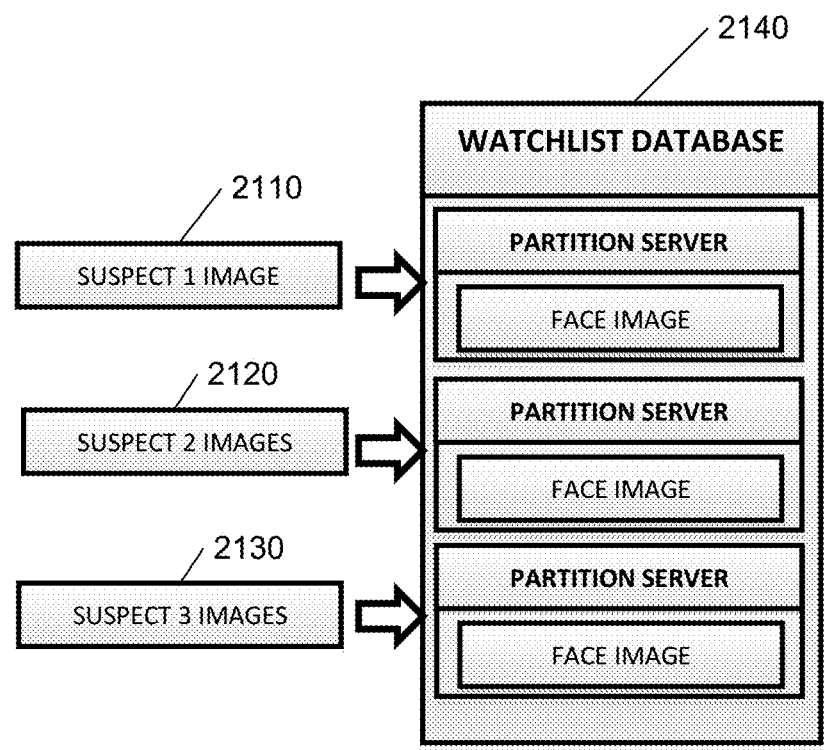

After identifying the batches of images, the system 300 processes the separate batch of images for each of the potential suspects in parallel 1920. The parallel processing of the separate batches of images is possible because, as shown in FIG. 21, the system 300 compares the images of each potential suspect 2110, 2120, and 2130 to detailed facial images (e.g., blob data) of persons in the watch list that are stored in a watch list database 2140 on different partition servers. The system 300 may process the separate batch of images for each of the potential suspects in parallel 1920 using the techniques described above with respect to reference numeral 470 and FIG. 14.

After completing parallel matching for a batch of images for each of the potential suspects, the system 300 determines, for each of the potential suspects, whether a match was found in the batch 1930. Based on a determination that a match was found in the batch for a potential suspect, the system 300 outputs 1950 the match result for the potential suspect. Based on a determination that a match was not found in the batch for a potential suspect, the system 300 determines whether another batch of images remains for the potential suspect 1940. Based on a determination that another batch of images does not remains for the potential suspect, the system 300 outputs 1950 an indication that a match result was not found for the potential suspect. Based on a determination that another batch of images remains for the potential suspect, the system 300 continues to process the additional batches of images that remain for the potential suspect until all of the batches of images have been processed. The system 300 continues to process the additional batches of images in parallel and continues to process the multiple potential suspects in parallel.

In addition, as the system 300 completes processing for a potential suspect (e.g., a match is found or an indication of no match result is determined), the system 300 selects a new potential suspect and begins processing of the new potential suspect in parallel with processing of the potential suspects for which processing has not completed. The system 300 may select the new potential suspect using the techniques described above with respect to FIG. 18 and reference numeral 1810. The system 300 continues to select new potential suspects and processes the new potential suspects in parallel until all of the potential suspects in the crowd have been processed.

Figure 22:
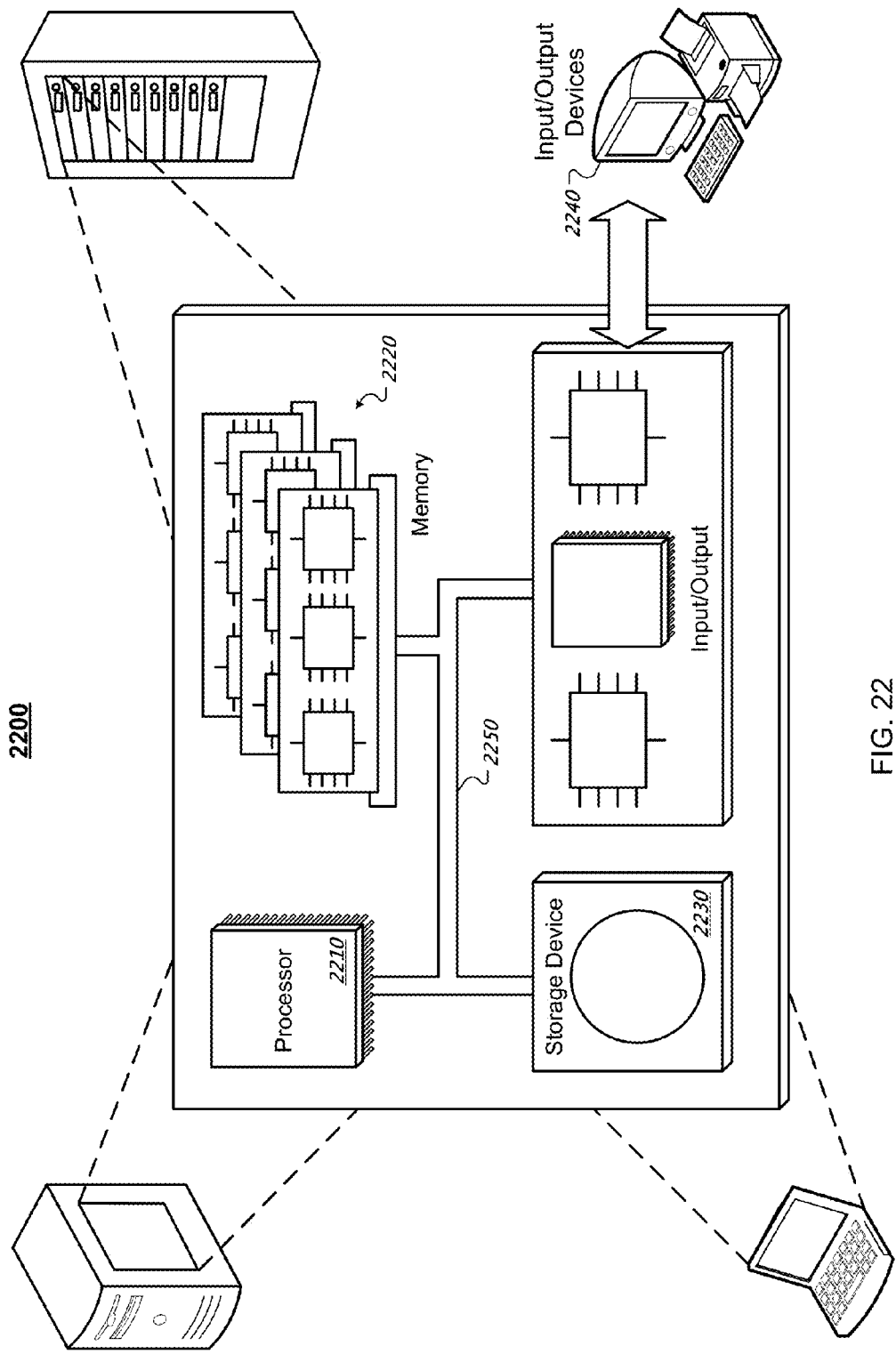

FIG. 22 is a schematic diagram of an example of a generic computer system 2200. The system 2200 can be used for the operations described in association with the processes 400, 500, 800, 1000, 1100, 1300, and 1400, according to some implementations. The system 2200 may be included in the systems 200 and 300.

The system 2200 includes a processor 2210, a memory 2220, a storage device 2230, and an input/output device 2240. Each of the components 2210, 2220, 2230, and 2240 are interconnected using a system bus 2250. The processor 2210 is capable of processing instructions for execution within the system 2200. In one implementation, the processor 2210 is a single-threaded processor. In another implementation, the processor 2210 is a multi-threaded processor. The processor 2210 is capable of processing instructions stored in the memory 2220 or on the storage device 2230 to display graphical information for a user interface on the input/output device 2240.

The memory 2220 stores information within the system 2200. In one implementation, the memory 2220 is a computer-readable medium. In one implementation, the memory 2220 is a volatile memory unit. In another implementation, the memory 2220 is a non-volatile memory unit.

The storage device 2230 is capable of providing mass storage for the system 2200. In one implementation, the storage device 2230 is a computer-readable medium. In various different implementations, the storage device 2230 may be a floppy disk device, a hard disk device, an optical disk device, or a tape device.

The input/output device 2240 provides input/output operations for the system 2200. In one implementation, the input/output device 2240 includes a keyboard and/or pointing device. In another implementation, the input/output device 2240 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A system comprising:
   a database storage;
   at least one processor; and
   at least one memory coupled to the at least one processor having stored thereon instructions which, when executed by the at least one processor, causes the at least one processor to perform operations comprising:
   for each of a plurality of potential reference images:
      comparing, for each of a plurality of images of persons on a watch list, the potential reference image with the image; and
      determining, for each of the plurality of images of the persons on the watch list, a similarity score that represents a similarity between the potential reference image and the image based on comparing the potential reference image with the image;
   determining which of the potential reference images have similarity scores that are most evenly distributed for the plurality of images of the persons on the watch list;
   selecting, as a reference image, a single potential reference image that has similarity scores that are most evenly distributed for the plurality of images of the persons on the watch list;
   managing, in the database storage, a) biometric data for the persons on the watch list using the similarity scores for the selected reference image and b) associations to additional biometric data for the persons on the watch list;
   accessing an image of a potential suspect;
   computing a similarity score that represents similarity between the image of the potential suspect and the selected reference image in response to accessing the image of the potential suspect;
   searching the watch list using the computed similarity score;
   identifying, using a result of the search of the watch list using the computed similarity score, a subset of the persons on the watch list each having a similarity score within a threshold of the computed similarity score for the potential suspect;
   determining whether the potential suspect matches a person in the subset of the persons on the watch list; and
   outputting a result based on determining whether the potential suspect matches a person in the subset of the persons on the watch list.

2. The system of claim 1, wherein managing a) the biometric data for the persons on the watch list using the similarity scores for the selected reference image and b) associations to additional biometric data for the persons on the watch list comprises maintaining numeric index values for the persons on the watch list using a similarity score for an image of the person and the selected reference image and maintaining blobs of images of the persons on the watch list stored on different partition servers.

3. The system of claim 1, wherein managing a) the biometric data for the persons on the watch list using the similarity scores for the selected reference image and b) associations to additional biometric data for the persons on the watch list comprises:
   creating, in a relational database storage, a table for the watch list;
   accessing biometric data for a person to be included on the watch list;
   determining, for each person on the watch list, an index value from the accessed biometric data for the person and that represents a similarity score for the selected reference image and an image of the person;
   storing, for each person on the watch list, the index value with an identifier for the person at an appropriate location in the table;
   determining, for each person on the watch list, whether blob data for the accessed biometric data of the person meets a threshold storage size; and
   based on determining whether the blob data for the accessed biometric data of the person meets the threshold storage size, performing one of:
      for each person on the watch list for which the blob data for the accessed biometric data of the person does not meet the threshold storage size, storing the blob data in the table with an identifier for the person, or for each person on the watch list for which the blob data for the accessed biometric data of the person meets the threshold storage size, storing the blob data in a non-relational storage and storing a link to the blob data in the table with the identifier.

4. The system of claim 1, wherein the operations further comprise:
    determining at least one criterion relevant to the image of the potential suspect based on at least one of sensor or camera data;
    selecting, as the reference image, the single potential reference image from among multiple reference images based on the at least one criterion; and
    accessing the selected reference image, wherein computing the similarity score that represents similarity between the image of the potential suspect and the selected reference image comprises computing the similarity score that represents similarity between the image of the potential suspect and the selected reference image selected from among the multiple reference images.

5. The system of claim 1, wherein the operations further comprise:
    adding one or more additional persons to the watch list;
    evaluating a distribution of similarity scores in the watch list;
    selecting, as the reference image, the single potential reference image from among multiple reference images based on evaluating the distribution of similarity scores in the watch list; and
    accessing the selected reference image, wherein computing the similarity score that represents similarity between the image of the potential suspect and the selected reference image comprises computing the similarity score that represents similarity between the image of the potential suspect and the selected reference image selected from among the multiple reference images.

6. The system of claim 1, wherein the operations further comprise:
    determining at least one criterion relevant to the image of the potential suspect based on at least one of sensor or camera data;
    evaluating distribution of similarity scores in the watch list;
    selecting, as the reference image, the single potential reference image from among multiple reference images based on the at least one criterion and evaluating the distribution of similarity scores in the watch list; and
    accessing the selected reference image, wherein computing the similarity score that represents similarity between the image of the potential suspect and the selected reference image comprises computing the similarity score that represents similarity between the image of the potential suspect and the selected reference image selected from among the multiple reference images.

7. The system of claim 1, wherein identifying the subset of the persons on the watch list each having a similarity score within a threshold of the computed similarity score for the potential suspect comprises:
    determining a quality measure for the image of the potential suspect and the images of the persons on the watch list;
    setting a score threshold based on the determined quality measure for the image of the potential suspect and the images of the persons on the watch list; and
    identifying a subset of the persons on the watch list each having a similarity score within the set score threshold of the computed similarity score for the potential suspect.

8. The system of claim 1, wherein identifying the subset of the persons on the watch list each having a similarity score within a threshold of the computed similarity score for the potential suspect comprises:
    determining a number of matches within a set of matches representative of the subset of the persons on the watch list;
    determining whether the number of matches within the set of matches is within a match threshold; and
    based on determining whether the number of matches within the set of matches is within the match threshold, performing one of:
        in response to determining that the number of matches within the set of matches is within the match threshold, using the set of matches as the subset of the persons on the watch list for which to perform additional processing, or
        in response to determining that the number of matches within the set of matches is not within the match threshold:
            selecting a new reference image that is different than the selected reference image;
            identifying a new set of matches within the score threshold for the selected new reference image; and
            using at least a portion of the new set of matches as the subset of the persons on the watch list.

9. The system of claim 8, wherein using at least the portion of the new set of matches as the subset of the persons on the watch list comprises:
    determining a set of common matches that includes matches which are in both a) the set of matches and b) the new set of matches;
    determining a number of matches within the set of common matches;
    determining whether the number of matches within the set of common matches is within a match threshold; and
    based on determining whether the number of matches within the set of common matches is within the match threshold, performing one of:
        based on determining that the number of matches within the set of common matches is within the match threshold, using the matches in the set of common matches as the subset of the persons on the watch list for which to perform additional processing, or
        based on a determining that the number of matches within the set of common matches is not within the match threshold, continuing to narrow potential matches using an additional reference image.

10. The system of claim 1, wherein:
    accessing the image of the potential suspect comprises accessing two or more images of the potential suspect; and
    the operations further comprise:
        controlling parallel pre-processing of the two or more images of the potential suspect to enhance a quality of each of the two or more images; and
        based on the parallel pre-processing, determining an image of the potential suspect to use in computing the similarity score that represents similarity between the image of the potential suspect and the selected reference image, wherein computing the similarity score that represents similarity between the image of the potential suspect and the selected reference image comprises computing the similarity score that represents similarity between the determined image of the potential suspect and the selected reference image.

11. The system of claim 10, wherein controlling the parallel pre-processing of the two or more images of the potential suspect to enhance a quality of each of the two or more images comprises:
   determining at least one criterion relevant to the two or more images of the potential suspect based on at least one of sensor or camera data;
   selecting a number of images of the potential suspect to use in the parallel pre-processing based on the at least one criterion; and
   controlling the parallel pre-processing of the selected number of images of the potential suspect.

12. The system of claim 10, wherein controlling the parallel pre-processing of the two or more images of the potential suspect to enhance the quality of each of the two or more images comprises:
   determining at least one criterion relevant to the two or more images of the potential suspect based on at least one of sensor or camera data;
   selecting types of operations to perform in the parallel pre-processing based on the at least one criterion; and
   controlling the parallel pre-processing of the two or more images of the potential suspect using the selected types of operations to perform in the parallel pre-processing.

13. The system of claim 10, wherein controlling the parallel pre-processing of the two or more images of the potential suspect to enhance the quality of each of the two or more images comprises:
   determining at least one criterion relevant to the two or more images of the potential suspect based on at least one of sensor or camera data;
   selecting a number images of the potential suspect to use in the parallel pre-processing based on the at least one criterion;
   selecting types of operations to perform in the parallel pre-processing based on the at least one criterion; and
   controlling the parallel pre-processing of the selected number of images of the potential suspect using the selected types of operations to perform in the parallel pre-processing.

14. The system of claim 1, wherein the operations further comprise:
   determining a context of a situation associated with the image of the potential suspect;
   setting a batch size based on the determined context of the situation;
   selecting a batch of images from the subset of the persons on the watch list based on the batch size;
   controlling parallel analysis of the image of the potential suspect against the batch of images; and
   controlling parallel analysis of the image of the potential suspect against additional batches of images until images of all the persons in the subset of the persons on the watch list have been analyzed, wherein determining whether the potential suspect matches a person in the subset of the persons on the watch list comprises determining whether the potential suspect matches a person in the subset of the persons on the watch list using a result of the controlled parallel analysis of the image of the potential suspect against the batches of images from the subset of the persons on the watch list.

15. The system of claim 1, wherein the operations further comprise:
   determining a criticality of a situation associated with the image of the potential suspect;
   setting a batch size based on the determined criticality of the situation;
   selecting a batch of images from the subset of the persons on the watch list based on the batch size;
   controlling parallel analysis of the image of the potential suspect against the batch of images; and
   controlling the parallel analysis of the image of the potential suspect against additional batches of images until images of all persons in the subset of the persons on the watch list have been analyzed, wherein determining whether the potential suspect matches a person in the subset of the persons on the watch list comprises determining whether the potential suspect matches a person in the subset of the persons on the watch list using a result of the controlled parallel analysis of the image of the potential suspect against the batches of images from the subset of the persons on the watch list.

16. The system of claim 1, wherein the operations further comprise:
   determining a context of a situation associated with the image of the potential suspect;
   determining a criticality of a situation associated with the image of the potential suspect;
   setting a batch size based on the determined context of the situation and the determined criticality of the situation;
   selecting a batch of images from the subset of the persons on the watch list based on the batch size;
   controlling parallel analysis of the image of the potential suspect against the batch of images; and
   controlling parallel analysis of the image of the potential suspect against additional batches of images until images of all persons in the subset of the persons on the watch list have been analyzed, wherein determining whether the potential suspect matches a person in the subset of the persons on the watch list comprises determining whether the potential suspect matches a person in the subset of the persons on the watch list using a result of the controlled parallel analysis of the image of the potential suspect against the batches of images from the subset of the persons on the watch list.

17. The system of claim 1, wherein determining whether the potential suspect matches a person in the subset of the persons on the watch list comprises:
   determining a number of unprocessed persons in the subset of the persons on the watch list for which the image of the potential suspect has not been compared to an image of the person;
   determining whether the number of unprocessed persons in the subset of the persons on the watch list is greater than a batch size; and
   in response to determining that the number of unprocessed persons in the subset is less than or equal to the batch size and for at least some potential suspects, performing a comparison of the image of the potential suspect against all remaining unprocessed persons in the subset of the persons on the watch list, wherein determining whether the potential suspect matches a person in the subset of the persons on the watch list comprises determining whether the potential suspect matches a person in the subset of the persons on the watch list using a result the performance of the comparison of the image of the potential suspect against all remaining unprocessed persons in the subset of the persons on the watch list.

18. The system of claim 17, wherein the operations further comprise:
   for at least some potential suspects, selecting a batch of persons from the subset of the persons on the watch list in response to determining that the number of unprocessed persons in the subset is greater than the batch size;

performing a comparison of the image of the potential suspect against all persons in the selected batch of persons;

determining whether a match is found within the selected batch using a result of the comparison of the image of the potential suspect against all persons in the selected batch; and based on determining whether the match is found within the selected batch using the result of the comparison of the image of the potential suspect against all persons in the selected batch, performing one of:

in response to determining that a match is found within the selected batch, ending processing and outputting the match, or in response to determining that a match is not found within the selected batch, processing one or more additional batches of images in parallel until all of the subset of the persons on the watch list have been processed or a match is found.

19. The system of claim 1, wherein the operations further comprise:

identifying a person of interest from the watch list;

determining a profile for the identified person of interest from the watch list;

accessing one or more images of a crowd that includes multiple potential suspects;

comparing the profile for the identified person of interest from the watch list to profiles of the multiple potential suspects included in the one or more images of the crowd; and selecting, from among the multiple potential suspects included in the one or more images of the crowd, the potential suspect for further processing based on determining, in response to comparing the profile for the identified person of interest from the watch list to profiles of the multiple potential suspects included in the one or more images of the crowd, that the profile for the identified person of interest from the watch list matches a profile of the potential suspect, wherein the operations of accessing an image of the potential suspect, identifying the subset of the persons from the watch list, determining whether the potential suspect matches a person in the subset of the persons on the watch list, and outputting the result based on determining whether the potential suspect matches a person in the subset of the persons on the watch list are conditioned on the selection of the potential suspect for further processing.

20. A method comprising:

for each of a plurality of potential reference images:

comparing, for each of a plurality of images of persons on a watch list, the potential reference image with the image; and determining, for each of the plurality of images of the persons on the watch list, a similarity score that represents a similarity between the potential reference image and the image based on comparing the potential reference image with the image;

determining which of the potential reference images have similarity scores that are most evenly distributed for the plurality of images of the persons on the watch list;

selecting, as a reference image, a single potential reference image that has similarity scores that are most evenly distributed for the plurality of images of the persons on the watch list;

managing, in a database storage, a) biometric data for the persons on the watch list using the similarity scores for the selected reference image and b) associations to additional biometric data for the persons on the watch list;

accessing an image of a potential suspect;

computing a similarity score that represents similarity between the image of the potential suspect and the selected reference image in response to accessing the image of the potential suspect;

searching the watch list using the computed similarity score;

identifying, using a result of the search of the watch list using the computed similarity score, a subset of the persons on the watch list each having a similarity score within a threshold of the computed similarity score for the potential suspect;

determining whether the potential suspect matches a person in the subset of the persons on the watch list; and outputting a result based on determining whether the potential suspect matches a person in the subset of the persons on the watch list.

21. At least one non-transitory computer-readable storage medium encoded with executable instructions that, when executed by at least one processor, cause the at least one processor to perform operations comprising:

for each of a plurality of potential reference images:

comparing, for each of a plurality of images of persons on a watch list, the potential reference image with the image; and determining, for each of the plurality of images of the persons on the watch list, a similarity score that represents a similarity between the potential reference image and the image based on comparing the potential reference image with the image;

determining which of the potential reference images have similarity scores that are most evenly distributed for the plurality of images of the persons on the watch list;

selecting, as a reference image, a single potential reference image that has similarity scores that are most evenly distributed for the plurality of images of the persons on the watch list;

managing, in a database storage, a) biometric data for the persons on the watch list using the similarity scores for the selected reference image and b) associations to additional biometric data for the persons on the watch list;

accessing an image of a potential suspect;

computing a similarity score that represents similarity between the image of the potential suspect and the selected reference image in response to accessing the image of the potential suspect;

searching the watch list using the computed similarity score;

identifying, using a result of the search of the watch list using the computed similarity score, a subset of the persons on the watch list each having a similarity score within a threshold of the computed similarity score for the potential suspect;

determining whether the potential suspect matches a person in the subset of the persons on the watch list; and outputting a result based on determining whether the potential suspect matches a person in the subset of the persons on the watch list.

* * * * *

UNITED STATES PATENT AND TRADEMARK OFFICE
CERTIFICATE OF CORRECTION

Page 1 of 1

PATENT NO.       : 9,292,749 B2
APPLICATION NO.  : 14/882552
DATED            : March 22, 2016
INVENTOR(S)      : Abhinav Tiwari et al.

It is certified that error appears in the above-identified patent and that said Letters Patent is hereby corrected as shown below:

In the Claims

In claim 13, column 41, line 32, delete "number" and insert -- number of --, therefor.

In claim 17, column 42, lines 58-59, delete "using a result the performance of the comparison" and insert -- using a result of the comparison --, therefor.

Signed and Sealed this
Seventh Day of June, 2016

Michelle K. Lee
*Director of the United States Patent and Trademark Office*